US012077728B2

(12) United States Patent
Barros et al.

(10) Patent No.: US 12,077,728 B2
(45) Date of Patent: Sep. 3, 2024

(54) LAUNDRY CARE ADDITIVE PARTICLES

(71) Applicant: The Procter & Gamble Company, Cincinnati, OH (US)

(72) Inventors: Andre Martim Barros, Woluwe Saint Etienne (BE); Mariana B. T. Cardoso, Brussels (BE); Johan Smets, Lubbeek (BE); Steven Daryl Smith, Fairfield, OH (US); Pierre Daniel Verstraete, Woluwe St. Lambert (BE); Valerie Wong, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 83 days.

(21) Appl. No.: 17/501,202

(22) Filed: Oct. 14, 2021

(65) Prior Publication Data

US 2022/0119743 A1 Apr. 21, 2022

Related U.S. Application Data

(60) Provisional application No. 63/092,829, filed on Oct. 16, 2020.

(51) Int. Cl.

| | |
|---|---|
| ***C11D 17/06*** | (2006.01) |
| ***C11D 3/08*** | (2006.01) |
| ***C11D 3/10*** | (2006.01) |
| ***C11D 3/37*** | (2006.01) |
| ***C11D 3/50*** | (2006.01) |
| ***C11D 17/00*** | (2006.01) |

(52) U.S. Cl.

CPC ............ *C11D 17/0039* (2013.01); *C11D 3/08* (2013.01); *C11D 3/10* (2013.01); *C11D 3/3707* (2013.01); *C11D 3/3738* (2013.01); *C11D 3/3757* (2013.01); *C11D 3/505* (2013.01); *C11D 17/06* (2013.01); *C11D 2111/12* (2024.01)

(58) Field of Classification Search

None

See application file for complete search history.

(56) References Cited

U.S. PATENT DOCUMENTS

| | | | |
|---|---|---|---|
| 5,500,223 | A | 3/1996 | Behan et al. |
| 6,243,909 | B1 | 6/2001 | Graham et al. |
| 6,537,583 | B1 | 3/2003 | Dupuis et al. |
| 8,425,940 | B2 | 4/2013 | Lapidot et al. |
| 8,931,971 | B2 | 1/2015 | Schwarz et al. |

(Continued)

FOREIGN PATENT DOCUMENTS

| | | | |
|---|---|---|---|
| CA | 2980792 | A1 | 2/2010 |
| CN | 103432970 | A | 12/2013 |

(Continued)

OTHER PUBLICATIONS

PCT Search Report and Written Opinion for PCT/US2021/054882 dated Feb. 2, 2022, 12 pages.

(Continued)

*Primary Examiner* — Lorna M Douyon

(74) *Attorney, Agent, or Firm* — Gary J. Foose

(57) ABSTRACT

Laundry care additive particles and a dryer sheet that include a water soluble carrier and capsules characterized by substantially inorganic shells, for example silica-based shells. The present disclosure further relates to methods of making and using such compositions.

20 Claims, 5 Drawing Sheets

(56) References Cited

U.S. PATENT DOCUMENTS

| | | | | |
|---|---|---|---|---|
| 9,603,784 | B2 | 3/2017 | Shimizu et al. | |
| 10,046,291 | B2 | 8/2018 | Yamazaki | |
| 10,285,928 | B2 | 5/2019 | Marsh et al. | |
| 2004/0163674 | A1 | 8/2004 | Policicchio et al. | |
| 2005/0158369 | A1 | 7/2005 | Dorschner et al. | |
| 2006/0188551 | A1 | 8/2006 | Hauser et al. | |
| 2008/0096780 | A1 | 4/2008 | Veugelers et al. | |
| 2009/0247449 | A1 | 10/2009 | Burdis | |
| 2010/0143422 | A1 | 6/2010 | Popplewell et al. | |
| 2010/0247660 | A1* | 9/2010 | Lei | A61K 8/27 424/490 |
| 2011/0104221 | A1 | 5/2011 | Galeone et al. | |
| 2011/0118161 | A1 | 5/2011 | Looft | |
| 2011/0152159 | A1 | 6/2011 | Labeque | |
| 2011/0177951 | A1 | 7/2011 | Toledano | |
| 2012/0104639 | A1 | 5/2012 | Traynor et al. | |
| 2012/0128747 | A1 | 5/2012 | Veronique et al. | |
| 2012/0202695 | A1 | 8/2012 | Toledano | |
| 2012/0237578 | A1 | 9/2012 | Lei | |
| 2013/0040817 | A1 | 2/2013 | Dreher | |
| 2014/0044761 | A1 | 2/2014 | Lei et al. | |
| 2014/0331414 | A1 | 11/2014 | Bone | |
| 2014/0338134 | A1 | 11/2014 | Fernandez Prieto et al. | |
| 2014/0342972 | A1 | 11/2014 | Smets | |
| 2016/0168509 | A1 | 6/2016 | Hitchcock | |
| 2016/0168510 | A1 | 6/2016 | Tasker et al. | |
| 2016/0168511 | A1* | 6/2016 | Hitchcock | C11D 3/505 512/4 |
| 2016/0184196 | A1 | 6/2016 | Baxter et al. | |
| 2016/0303531 | A1 | 10/2016 | Yamazaki | |
| 2016/0317993 | A1 | 11/2016 | Rotello et al. | |
| 2018/0085291 | A1 | 3/2018 | Sasaki | |
| 2018/0207451 | A1 | 7/2018 | Toledano | |
| 2018/0339176 | A1 | 11/2018 | Toledano | |
| 2020/0114328 | A1 | 4/2020 | Jerri et al. | |
| 2020/0129947 | A1 | 4/2020 | Ouali et al. | |
| 2020/0255776 | A1* | 8/2020 | Schmiedel | C11D 3/202 |
| 2020/0330948 | A1* | 10/2020 | Cardoso | D06M 23/12 |
| 2020/0330949 | A1* | 10/2020 | Cardoso | A61K 9/5073 |
| 2020/0330950 | A1* | 10/2020 | Cardoso | A61K 8/26 |
| 2022/0119741 | A1 | 4/2022 | Smets et al. | |
| 2022/0119742 | A1 | 4/2022 | Smets et al. | |

FOREIGN PATENT DOCUMENTS

| | | | |
|---|---|---|---|
| CN | 105612248 | A | 5/2016 |
| CN | 105734540 | A | 7/2016 |
| CN | 107001979 | A | 8/2017 |
| CN | 107249545 | B | 5/2021 |
| EP | 1767613 | A1 | 3/2007 |
| EP | 1767614 | A1 | 3/2007 |
| EP | 2078696 | A1 | 7/2009 |
| EP | 3181674 | A1 | 6/2017 |
| EP | 2865423 | B1 | 3/2020 |
| JP | 2010215806 | A | 9/2010 |
| WO | 0145615 | A1 | 6/2001 |
| WO | 2005044220 | A1 | 5/2005 |
| WO | 2007019201 | A1 | 2/2007 |
| WO | 2009106318 | A2 | 9/2009 |
| WO | 2011154421 | A1 | 12/2011 |
| WO | 2013078551 | A1 | 6/2013 |
| WO | 2013083760 | A2 | 6/2013 |
| WO | 2013174921 | A1 | 11/2013 |
| WO | 2016100477 | A1 | 6/2016 |
| WO | 2016100479 | A1 | 6/2016 |
| WO | 2017016636 | A1 | 2/2017 |
| WO | 2017075074 | A1 | 5/2017 |
| WO | 2018189588 | A1 | 10/2018 |
| WO | 2018231886 | A1 | 12/2018 |
| WO | 2020077451 | A1 | 4/2020 |
| WO | 2020214876 | A1 | 10/2020 |
| WO | 2020214877 | A1 | 10/2020 |
| WO | 2020214878 | A1 | 10/2020 |

OTHER PUBLICATIONS

All Office Actions; U.S. Appl. No. 18/115,890, filed on Mar. 1, 2023.

Unpublished U.S. Appl. No. 18/115,890, filed on Mar. 1, 2023, to Mariana B T Cardoso et. al.

All Office Actions; U.S. Appl. No. 17/727,857, filed on Apr. 25, 2022.

Unpublished U.S. Appl. No. 17/727,857, filed on Apr. 25, 2022, to Mariana B T Cardoso et al.

All Office Actions; U.S. Appl. No. 17/498,016, filed on Oct. 11, 2021.

Unpublished U.S. Appl. No. 17/500,984, filed on Sep. 14, 2021, to Jonathan Robert Cetti et al.

All Office Actions; U.S. Appl. No. 16/851,176, filed on Apr. 17, 2020.

All Office Actions; U.S. Appl. No. 16/851,194, filed on Apr. 17, 2020.

All Office Actions; U.S. Appl. No. 16/851,173, filed on Apr. 17, 2020.

All Office Actions; U.S. Appl. No. 17/500,970, filed on Oct. 14, 2021.

All Office Actions; U.S. Appl. No. 17/500,979, filed on Oct. 14, 2021.

All Office Actions; U.S. Appl. No. 17/500,984, filed on Oct. 14, 2021.

Jyothi et al, "Microencapsulation techniques, factors influencing encapsulation efficiency", Journal of Microencapsulation, 27:3, pp. 187-197.

Liu, M.: "Understanding the mechanical strength of micro capsules and their adhesion on fabric surfaces",2010, University of Birmingham,XP055511234, cited in the application pp. 86-89 p. 104-p. 106 p. 118.

Thompson et al., "Colloidosomes: Synthesis, properties and applications", Journal of Colloid and Interface Science, 447, 2015, pp. 217-228.

Unpublished U.S. Appl. No. 17/498,016, filed on Oct. 11, 2021, to Steven Daryl Smith et al.

Unpublished U.S. Appl. No. 17/500,970, filed on Oct. 14, 2021, to Andre Martim Barros et al.

Unpublished U.S. Appl. No. 17/500,979, filed on Oct. 14, 2021, to Andre Martim Barros et al.

All Office Actions; U.S. Appl. No. 18/410,116, filed on Jan. 11, 2024.

All Office Actions; U.S. Appl. No. 18/418,649, filed on Jan. 22, 2024.

Unpublished U.S. Appl. No. 18/410,116, filed on Jan. 11, 2024, to Mariana B. T. Cardoso et al.

Unpublished U.S. Appl. No. 18/418,649, filed on Jan. 22, 2024, to Andre Martim Barros et al.

All Office Actions; U.S. Appl. No. 18/581,755, filed on Feb. 20, 2024.

Unpublished U.S. Appl. No. 18/581,755, filed on Feb. 20, 2024, to Jonathan Robert Cetti et al.

* cited by examiner

LAUNDRY CARE ADDITIVE PARTICLES

FIELD OF THE INVENTION

Laundry care additive particles. The composition includes plurality of particles and the particles comprise a water soluble carrier and capsules having substantially inorganic shells, for example silica-based shells. The present disclosure further relates to methods of making and using such compositions. The present disclosure further relates to a dryer sheet that includes capsules having substantially inorganic shells, for example silica-based shells.

BACKGROUND OF THE INVENTION

Laundry care particle additives and dryer sheets are formulated with perfumed core/shell capsules. Typically, the cores of such capsules include perfume, and the shell often comprises a polymeric material such as an aminoplast, a polyurea, or a polyacrylate. These capsules are useful in delivering the benefit agent to a target surface, such as a fabric. Then, at various touchpoints, the capsules will rupture, releasing the perfume. However, perfume capsules are known to leak, thereby reducing the efficiency of the perfume delivery system.

Furthermore, the perfume capsules typically encapsulate a variety of perfume raw materials ("PRMs"). Problematically, different PRMs may leak at different rates through the capsule wall. Over time, such as while the product is being transported or stored, the character of the perfume can change due to some PRMs leaking more than others. This can lead to olfactory experiences that are less desirable than what the manufacturer formulated for, quality control issues, and even consumer dissatisfaction when the freshness profile provided by the first dose of the product is different than that provided by the last dose.

There is a need for laundry care particle additives and dryer sheets that include perfume delivery systems that have improved perfume leakage profiles.

SUMMARY OF THE INVENTION

The present disclosure relates to a composition comprising a plurality of particles, wherein said particles comprise: about 25% to about 99% by weight water soluble carrier; and a plurality of capsules dispersed in said water soluble carrier, wherein said capsules comprise a core and a shell surrounding said core and said core comprises perfume raw materials;

wherein said shell comprises from about 90% to 100%, optionally from about 95% to 100%, optionally from about 99% to 100% by weight of the shell of an inorganic material.

The present disclosure further relates to a composition comprising a plurality of particles, wherein said particles comprise: about 25% to about 99% by weight water soluble carrier; and a plurality of capsules dispersed in said water soluble carrier, wherein said capsules comprise a core and a shell surrounding said core and said core comprises perfume raw materials; wherein said shell comprises: a substantially inorganic first shell component comprising a condensed layer and a nanoparticle layer, wherein said condensed layer comprises a condensation product of a precursor, wherein said nanoparticle layer comprises inorganic nanoparticles, and wherein said condensed layer is disposed between said core and said nanoparticle layer; and an inorganic second shell component surrounding said first shell component, wherein said second shell component surrounds said nanoparticle layer;

wherein said precursor comprises at least one compound selected from the group consisting of Formula (I), Formula (II), and a mixture thereof; wherein Formula (I) is $(M^vO_zY_n)_w$;

wherein Formula (II) is $(M^vO_zY_nR^1_p)_w$; wherein for Formula (I), Formula (II), or the mixture thereof, each M is independently selected from the group consisting of silicon, titanium, and aluminum, v is the valence number of M and is 3 or 4, z is from 0.5 to 1.6, each Y is independently selected from the group consisting of —OH, —$OR^2$, halogen,

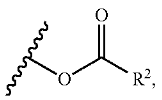

—$NH_2$, —$NHR^2$, —$N(R^2)_2$, and

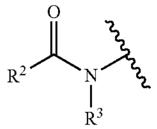
, wherein $R^2$ is a $C_1$ to $C_{20}$ alkyl, $C_1$ to $C_{20}$ alkylene, $C_6$ to $C_{22}$ aryl, or a 5-12 membered heteroaryl, wherein said heteroaryl comprises from 1 to 3 ring heteroatoms selected from the group consisting of O, N, and S, wherein $R^3$ is a H, $C_1$ to $C_{20}$ alkyl, $C_1$ to $C_{20}$ alkylene, $C_6$ to $C_{22}$ aryl, or a 5-12 membered heteroaryl, wherein said heteroaryl comprises from 1 to 3 ring heteroatoms selected from O, N, and S, w is from 2 to 2000; wherein for Formula (I) n is from 0.7 to (v−1); and wherein for Formula (II) n is from 0 to (v−1), each $R^1$ is independently selected from the group consisting of a $C_1$ to $C_{30}$ alkyl, a $C_1$ to $C_{30}$ alkylene, a $C_1$ to $C_{30}$ alkyl substituted with one or more of a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl, and a $C_1$ to $C_{30}$ alkylene substituted with one or more of a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl, and p is a positive number up to pmax, wherein $pmax=60/[9*Mw(R^1)+8]$, wherein $Mw(R^1)$ is the molecular weight of the $R^1$ group.

The present disclosure further relates to a dryer sheet comprising: a nonwoven fibrous layer; and a solid fabric softener composition carried on or within said nonwoven fibrous layer; wherein said solid fabric softener composition comprises a plurality of capsules dispersed in said solid fabric softener composition, wherein said capsules comprise a core and a shell surrounding said core and said core comprises perfume raw materials; wherein said shell comprises from about 90% to 100%, optionally from about 95% to 100%, optionally from about 99% to 100% by weight of the shell of an inorganic material.

DETAILED DESCRIPTION OF THE INVENTION

Figure 1:
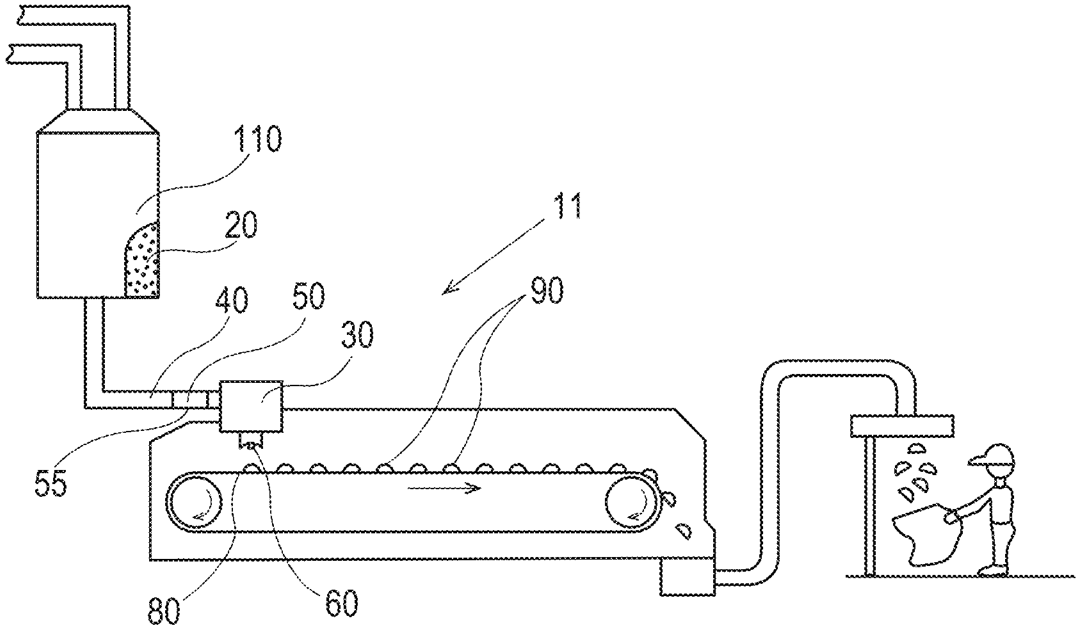
FIG. 1 is a particle making apparatus.

The present disclosure relates to laundry care additive particles that include a water soluble carrier and a plurality of perfume containing capsules dispersed in the carrier. The capsules when dispersed in the carrier have a consistent permeability to a variety of perfume raw materials which provides users with a consistent scent experience over the time frame in which a package of the laundry care additive is used and at the various touch points when the user handles or wears laundry treated with such a laundry care additive. The present disclosure further relates to a dryer sheet comprising capsules.

The laundry care additive particles can be practical for providing benefits to laundry through the wash. That is, the particles can be employed by the user by dispensing the particles into the washing machine prior to starting the washing machine cycle, particularly the wash sub-cycle. Through the wash compositions, such as those described herein, differ from through the rinse compositions. Through the rinse compositions are designed to be dispensed during the rinse sub-cycle of the washing machine. In modern washing machines, the rinse sub-cycle is initiated automatically after the wash sub-cycle is completed, without any further input from the consumer. Compositions that are to be dispensed during the rinse sub-cycle are commonly dosed to a separate dosing chamber that is part of the washing machine that dispenses the through the rinse composition during the rinse sub-cycle, for example a dispensing drawer or from that agitator in the tub.

It is believed that capsules of the type disclosed herein when used in water soluble carrier work surprisingly well in controlling the leakage of the perfume raw materials in the presently disclosed compositions, resulting in relatively low and consistent perfume leakage. Without wishing to be bound by theory, it is believed that the leakage of perfume raw materials is driven by radically different mechanisms for shell containing highly crosslinked inorganic materials compared to shell containing organic polymeric materials. Specifically, the diffusion of small molecules such as perfume raw materials ("PRMs") across a homogenous organic polymeric shell is similar to the diffusion mechanism across a homogeneous polymeric membrane. In this case, the permeability of the polymeric membrane for a given solute depends both on the polymer free volume (impacted by degree of crystallinity and cross-linked density) as well as the relative solubility of the solute for the polymer. Since different PRMs will have different ranges of relevant physical and chemical properties (e.g., molecular weight and polarity), the rates of diffusion are not uniform for a given set of PRMs when the physical and chemical properties are also not uniform.

On the other hand, it is believed that diffusion of small molecules across a highly crosslinked inorganic shell occurs primarily through the microchannels formed by the percolating network of micropores present in the shell. Such highly crosslinked inorganic shell can be obtained by using a second shell component in combination with a first shell component, as disclosed with the present disclosure. In this case, it is believed that the permeability of the inorganic shell primarily depends on the number, density, and dimensions of the microchannels that are effectively connecting the core and continuous phases, which can result in the PRM leakage rates being relatively uniform or consistent with respect to each other, as well as being relatively low.

Because the various PRMs leak from the disclosed capsules in the disclosed compositions at relatively consistent rates, it is further believed that the intended character of the perfume is maintained, leading to a more satisfactory and consistent olfactory performance.

The terms "substantially free of" or "substantially free from" may be used herein. This means that the indicated material is at the very minimum not deliberately added to the composition to form part of it, or, optionally, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

As described herein, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Water Soluble Carrier

The particles can comprise a water soluble carrier. The water soluble carrier acts to carry the capsules to the wash liquor. Upon dissolution of the water soluble carrier, the capsules are dispersed into the wash liquor and deposited onto the laundry.

The water soluble carrier can be a material that is soluble in a wash liquor within a short period of time, for instance less than about 10 minutes.

Water soluble means that the material, carrier material, or particle is soluble or dispersible in water, and optionally has a water-solubility of at least 50%, optionally at least 75% or even at least 95%, as measured by the method set out hereafter using a glass-filter with a maximum pore size of 20 microns: 50 grams±0.1 gram of the carrier is added in a pre-weighed 400 mL beaker and 245 mL±1 mL of distilled water is added. This is stirred vigorously on a magnetic stirrer set at 600 rpm, for 30 minutes. Then, the mixture is filtered through a sintered-glass filter with a pore size as defined above (max. 20 micron). The steps are performed at a temperature of 23° C.±1.0° C. and a relative humidity of 50%±2%. The water is dried off from the collected filtrate by any conventional method, and the weight of the remaining material is determined (which is the dissolved or dispersed fraction). Then, the percentage solubility or dispersibility can be calculated.

The water soluble carrier can be selected from the group consisting of water soluble inorganic alkali metal salt, water-soluble alkaline earth metal salt, water-soluble organic alkali metal salt, water-soluble organic alkaline earth metal salt, water soluble carbohydrate, water-soluble silicate, water soluble urea, and any combination thereof.

Alkali metal salts can be, for example, selected from the group consisting of salts of lithium, salts of sodium, and salts of potassium, and any combination thereof. Useful alkali metal salts can be, for example, selected from the group consisting of alkali metal fluorides, alkali metal chlorides, alkali metal bromides, alkali metal iodides, alkali metal sulfates, alkali metal bisulfates, alkali metal phosphates, alkali metal monohydrogen phosphates, alkali metal dihydrogen phosphates, alkali metal carbonates, alkali metal monohydrogen carbonates, alkali metal acetates, alkali metal citrates, alkali metal lactates, alkali metal pyruvates, alkali metal silicates, alkali metal ascorbates, and combinations thereof.

Alkali metal salts can be selected from the group consisting of sodium fluoride, sodium chloride, sodium bromide, sodium iodide, sodium sulfate, sodium bisulfate, sodium phosphate, sodium monohydrogen phosphate, sodium dihydrogen phosphate, sodium carbonate, sodium hydrogen carbonate, sodium acetate, sodium citrate, sodium lactate, sodium tartrate, sodium silicate, sodium ascorbate, potassium fluoride, potassium chloride, potassium bromide, potassium iodide, potassium sulfate, potassium bisulfate, potassium phosphate, potassium monohydrogen phosphate, potassium dihydrogen phosphate, potassium carbonate, potassium monohydrogen carbonate, potassium acetate, potassium citrate, potassium lactate, potassium tartrate, potassium silicate, potassium, ascorbate, and combinations thereof.

Alkaline earth metal salts can be selected from the group consisting of salts of magnesium, salts of calcium, and the like, and combinations thereof. Alkaline earth metal salts can be selected from the group consisting of alkaline metal fluorides, alkaline metal chlorides, alkaline metal bromides, alkaline metal iodides, alkaline metal sulfates, alkaline metal bisulfates, alkaline metal phosphates, alkaline metal monohydrogen phosphates, alkaline metal dihydrogen phosphates, alkaline metal carbonates, alkaline metal monohydrogen carbonates, alkaline metal acetates, alkaline metal citrates, alkaline metal lactates, alkaline metal pyruvates, alkaline metal silicates, alkaline metal ascorbates, and combinations thereof. Alkaline earth metal salts can be selected from the group consisting of magnesium fluoride, magnesium chloride, magnesium bromide, magnesium iodide, magnesium sulfate, magnesium phosphate, magnesium monohydrogen phosphate, magnesium dihydrogen phosphate, magnesium carbonate, magnesium monohydrogen carbonate, magnesium acetate, magnesium citrate, magnesium lactate, magnesium tartrate, magnesium silicate, magnesium ascorbate, calcium fluoride, calcium chloride, calcium bromide, calcium iodide, calcium sulfate, calcium phosphate, calcium monohydrogen phosphate, calcium dihydrogen phosphate, calcium carbonate, calcium monohydrogen carbonate, calcium acetate, calcium citrate, calcium lactate, calcium tartrate, calcium silicate, calcium ascorbate, and combinations thereof.

Inorganic salts, such as inorganic alkali metal salts and inorganic alkaline earth metal salts, do not contain carbon. Organic salts, such as organic alkali metal salts and organic alkaline earth metal salts, contain carbon. The organic salt can be an alkali metal salt or an alkaline earth metal salt of sorbic acid (i.e., a sorbate). Sorbates can be selected from the group consisting of sodium sorbate, potassium sorbate, magnesium sorbate, calcium sorbate, and combinations thereof.

The water soluble carrier can be or comprise a material selected from the group consisting of a water-soluble inorganic alkali metal salt, a water-soluble organic alkali metal salt, a water-soluble inorganic alkaline earth metal salt, a water-soluble organic alkaline earth metal salt, a water-soluble carbohydrate, a water-soluble silicate, a water-soluble urea, and combinations thereof. The water soluble carrier can be selected from the group consisting of sodium chloride, potassium chloride, calcium chloride, magnesium chloride, sodium sulfate, potassium sulfate, magnesium sulfate, sodium carbonate, potassium carbonate, sodium hydrogen carbonate, potassium hydrogen carbonate, sodium acetate, potassium acetate, sodium citrate, potassium citrate, sodium tartrate, potassium tartrate, potassium sodium tartrate, calcium lactate, water glass, sodium silicate, potassium silicate, dextrose, fructose, galactose, isoglucose, glucose, sucrose, raffinose, isomalt, xylitol, candy sugar, coarse sugar, and combinations thereof. In one embodiment, the water soluble carrier can be sodium chloride. In one embodiment, the water soluble carrier can be table salt.

The water soluble carrier can be or comprise a material selected from the group consisting of sodium bicarbonate, sodium sulfate, sodium carbonate, sodium formate, calcium formate, sodium chloride, sucrose, maltodextrin, corn syrup solids, corn starch, wheat starch, rice starch, potato starch, tapioca starch, clay, silicate, citric acid carboxymethyl cellulose, fatty acid, fatty alcohol, glyceryl diester of hydrogenated tallow, glycerol, and combinations thereof.

The water soluble carrier can be selected from the group consisting of water soluble organic alkali metal salt, water soluble inorganic alkaline earth metal salt, water soluble organic alkaline earth metal salt, water soluble carbohydrate, water soluble silicate, water soluble urea, starch, clay, water insoluble silicate, citric acid carboxymethyl cellulose, fatty acid, fatty alcohol, glyceryl diester of hydrogenated tallow, glycerol, polyethylene glycol, and combinations thereof.

The water soluble carrier can be selected from the group consisting of disaccharides, polysaccharides, silicates, zeolites, carbonates, sulfates, citrates, and combinations thereof.

The water soluble carrier can be selected from the group consisting of polyethylene glycol, sodium acetate, sodium bicarbonate, sodium chloride, sodium silicate, polypropylene glycol polyoxoalkylene, polyethylene glycol fatty acid ester, polyethylene glycol ether, sodium sulfate, starch, and mixtures thereof.

The water soluble carrier can be a water soluble polymer. The water soluble polymer can be selected from the group consisting of C8-C22 alkyl polyalkoxylate comprising more than about 40 alkoxylate units, ethoxylated nonionic surfactant having a degree of ethoxylation greater than about 30, polyalkylene glycol having a weight average molecular weight from about 2000 to about 15000, and combinations thereof.

The water soluble carrier can be a water soluble polymer. The water soluble polymer can be a block copolymer having Formulae (I), (II), (III) or (IV), $R^1O-(EO)x-(PO)y-R^2$ (I), $R^1O—(PO)x-(EO)y-R^2$ (II), $R^1O-(EO)o-(PO)p-(EO)q-R^2$ (III), $R^1O—(PO)o-(EO)p-(PO)q-R^2$ (IV), or a combination thereof; wherein EO is a $—CH_2CH_2O—$ group, and PO is a $—CH(CH_3)CH_2O—$ group; $R^1$ and $R^2$ independently is H or a C1-C22 alkyl group; x, y, o, p, and q independently is 1-100; provided that the sum of x and y is greater than 35, and the sum of o, p and q is greater than 35; wherein the block copolymer has a molecular weight ranging from about 3000 g/mol to about 15,000 g/mol.

The water soluble polymer can be a block copolymer or block copolymers, for example a block copolymer based on ethylene oxide and propylene oxide selected from the group consisting of PLURONIC-F38, PLURONIC-F68, PLURONIC-F77, PLURONIC-F87, PLURONIC-F88, and combinations thereof. PLURONIC materials are available from BASF.

The water soluble polymer can be selected from the group consisting of polyvinyl alcohols (PVA), modified PVAs; polyvinyl pyrrolidone; PVA copolymers such as PVA/polyvinyl pyrrolidone and PVA/polyvinyl amine; partially hydrolyzed polyvinyl acetate; polyalkylene oxides such as polyethylene oxide; polyethylene glycols; acrylamide; acrylic acid; cellulose, alkyl cellulosics such as methyl cellulose, ethyl cellulose and propyl cellulose; cellulose ethers; cellulose esters; cellulose amides; polyvinyl acetates; polycarboxylic acids and salts; polyaminoacids or peptides; polyamides; polyacrylamide; copolymers of maleic/acrylic acids; polysaccharides including starch, modified starch; gelatin; alginates; xyloglucans, other hemicellulosic polysaccharides including xylan, glucuronoxylan, arabinoxylan, mannan, glucomannan and galactoglucomannan; and natural gums such as pectin, xanthan, and carrageenan, locus bean, arabic, tragacanth; and combinations thereof. In one embodiment the polymer comprises polyacrylates, especially sulfonated polyacrylates and water-soluble acrylate copolymers; and alkylhydroxy cellulosics such as methylcellulose, carboxymethylcellulose sodium, modified carboxy-methylcellulose, dextrin, ethylcellulose, propylcellulose, hydroxyethyl cellulose, hydroxypropyl methylcellulose, maltodextrin, polymethacrylates. In yet another embodiment the water soluble polymer can be selected from the group consisting of PVA; PVA copolymers; hydroxypropyl methyl cellulose (HPMC); and mixtures thereof.

The water soluble polymer can be selected from the group consisting of polyvinyl alcohol, modified polyvinyl alcohol, polyvinyl pyrrolidone, polyvinyl alcohol/polyvinyl pyrrolidone, polyvinyl alcohol/polyvinyl amine, partially hydrolyzed polyvinyl acetate, polyalkylene oxide, polyethylene glycol, acrylamide, acrylic acid, cellulose, alkyl cellulosics, methyl cellulose, ethyl cellulose, propyl cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides, starch, modified starch, gelatin, alginates, xyloglucans, hemicellulosic polysaccharides, xylan, glucuronoxylan, arabinoxylan, mannan, glucomannan, galactoglucomannan, natural gums, pectin, xanthan, carrageenan, locus bean, arabic, tragacanth, polyacrylates, sulfonated polyacrylates, water-soluble acrylate copolymers, alkylhydroxy cellulosics, methylcellulose, carboxymethylcellulose sodium, modified carboxy-methylcellulose, dextrin, ethylcellulose, propylcellulose, hydroxyethyl cellulose, hydroxypropyl methylcellulose, maltodextrin, polymethacrylates, polyvinyl alcohol copolymers, hydroxypropyl methyl cellulose, and mixtures thereof.

The water soluble polymer can be an organic material. Organic water soluble polymers may provide a benefit of being readily soluble in water.

The water soluble polymer can be selected from the group consisting of polyethylene glycol, polypropylene glycol polyoxoalkylene, polyethylene glycol fatty acid ester, polyethylene glycol ether, starch, and mixtures thereof.

The water soluble polymer can be polyethylene glycol (PEG). PEG can be a convenient material to employ to make particles because it can be sufficiently water soluble to dissolve during a wash cycle when the particles have the range of mass disclosed herein. Further, PEG can be easily processed as melt. The onset of melt temperature of PEG can vary as a function of molecular weight of the PEG. The particles can comprise about 25% to about 94% by weight PEG having a weight average molecular weight from about 2000 to about 15000. PEG has a relatively low cost, may be formed into many different shapes and sizes, minimizes unencapsulated perfume diffusion, and dissolves well in water. PEG comes in various weight average molecular weights. A suitable weight average molecular weight range of PEG includes from about 2,000 to about 13,000, alternatively from about 4,000 to about 13,000, alternatively from about 4,000 to about 12,000, alternatively from about 4,000 to about 11,000, alternatively from about 5,000 to about 11,000, alternatively from about 6,000 to about 10,000, alternatively from about 7,000 to about 9,000, alternatively combinations thereof. PEG is available from BASF, for example PLURIOL E 8000, or other PLURIOL product. The water soluble polymer can be a mixture of two or more polyethylene glycol compositions, one having a first weight average molecular weight (e.g. 9000) and the other having a second weight average molecular weight (e.g. 4000), the second weight average molecular weight differing from the first weight average molecular weight.

The particles can comprise about 25% to about 99% by weight water soluble carrier. The particles can comprise from about 35% to about 95%, optionally from about 50% to about 80%, optionally combinations thereof and any whole percentages or ranges of whole percentages within any of the aforementioned ranges, of water soluble carrier by weight of the particles.

The plurality of particles can comprise individual particles that comprise about 25% to about 99% by weight of the particles water soluble carrier; and about 0.1% to about 20% by weight of the particles capsules; wherein the capsules are dispersed in a matrix of the water soluble polymer.

The particles can comprise about 25% to about 99% by weight of the individual particles of PEG. Optionally, the individual particles can comprise from about 25% to about 95%, optionally from about 35% to about 95%, optionally from about 50% to about 80%, optionally combinations thereof and any whole percentages or ranges of whole percentages within any of the aforementioned ranges, of PEG by weight of the particles.

The water soluble polymer can comprise a material selected from the group consisting of: a polyalkylene polymer of formula $H—(C_2H_4O)_x—(CH(CH_3)CH_2O)_y—(C_2H_4O)_z—OH$ wherein x is from about 50 to about 300, y is from about 20 to about 100, and z is from about 10 to about 200; a polyethylene glycol fatty acid ester of formula $(C_2H_4O)_q—C(O)O—(CH_2)_r—CH_3$ wherein q is from about 20 to about 200 and r is from about 10 to about 30; a polyethylene glycol fatty alcohol ether of formula HO—$(C_2H_4O)_s$—$(CH_2)_t$)—$CH_3$ wherein s is from about 30 to about 250 and t is from about 10 to about 30; and mixtures thereof. The polyalkylene polymer of formula H—$(C_2H_4O)_x$—$(CH(CH_3)CH_2O)_y$—$(C_2H_4O)_z$—OH wherein x is from about 50 to about 300, y is from about 20 to about 100, and z is from about 10 to about 200, can be a block copolymer or random copolymer.

The water soluble polymer can comprise: polyethylene glycol; a polyalkylene polymer of formula H—$(C_2H_4O)_x$—$(CH(CH_3)CH_2O)_y$—$(C_2H_4O)_z$—OH wherein x is from about 50 to about 300; y is from about 20 to about 100, and z is from about 10 to about 200; a polyethylene glycol fatty acid ester of formula $(C_2H_4O)_q$—C(O)O—$(CH_2)_r$—$CH_3$ wherein q is from about 20 to about 200 and r is from about 10 to about 30; and a polyethylene glycol fatty alcohol ether of formula HO—$(C_2H_4O)_s$—$(CH_2)_t$)—$CH_3$ wherein s is from about 30 to about 250 and t is from about 10 to about 30.

The water soluble polymer can comprise from about 20% to about 95% by weight of the plurality of particles or by weight of the individual particles of polyalkylene polymer of formula H—$(C_2H_4O)_x$—$(CH(CH_3)CH_2O)_y$—$(C_2H_4O)_z$—OH wherein x is from about 50 to about 300; y is from about 20 to about 100, and z is from about 10 to about 200.

The water soluble polymer can comprise from about 1% to about 20% by weight of the plurality of particles or by weight of the individual particles polyethylene glycol fatty acid ester of formula $(C_2H_4O)_q$—C(O)O—$(CH_2)_r$—$CH_3$ wherein q is from about 20 to about 200 and r is from about 10 to about 30.

The water soluble polymer can comprise from about 1% to about 10% by weight of the plurality of particles or by weight of the individual particles of polyethylene glycol fatty alcohol ether of formula HO—$(C_2H_4O)_s$—$(CH_2)_t$)—$CH_3$ wherein s is from about 30 to about 250 and t is from about 10 to about 30.

The water soluble carrier can comprise plasticizer polyol (from 0% to 3% by weight of the particles), wherein the plasticizer polymer is optionally a liquid at 20 C and 1 atmosphere of pressure; water (from 1% to 20%, or 1% to 12%, or 6% to 8%, by weight of the particles); sugar alcohol polyol selected from the group consisting of erythritol, xylitol, mannitol, isomalt, maltitol, lactitol, trehalose, lactose, tagatose, sucralose, and mixtures thereof (from 45% to 80%, or 50% to 70%, or 50% to 60%, by weight of the particles); wherein said particles further comprise: (a) modified starch having a dextrose equivalent from 15 to 20 and said sugar alcohol polyol and said modified starch are present at a weight ratio of said sugar alcohol polyol to said modified starch from 2:1 to 16:1, or from 2:1 to 10:1, or from 2:1 to 3:1; or (b) modified starch having a dextrose equivalent from 4 to less than 15 and said sugar alcohol polyol and said modified starch are present at a weight ratio of said sugar alcohol polyol to said modified starch from 1.5:1 to 16:1, or from 1.5:1 to 10:1, or from 1.5:1 to 4. The modified starch can have a dextrose equivalent from 15 to 20 and said sugar alcohol polyol and said modified starch can be present at a ratio from 2:1 to 16:1, or from 2:1 to 10:1, or from 2:1 to 3:1. The modified starch can have a dextrose equivalent from 4 to less than 15 and said sugar alcohol polyol and said modified starch can be present at a weight ratio of said sugar alcohol polyol to said modified starch from 1.5:1 to 16:1, or from 1.5:1 to 10:1, or from 1.5:1 to 4:1. The modified starch can have a dextrose equivalent from 4 to 12. The modified starch can be maltodextrin. The sugar alcohol polyol can be mannitol. The plasticizer polyol can be selected from the group consisting of glycerin, dipropylene glycol, propylene glycol, and mixtures thereof.

The particles can comprise from about 25% to about 99% by weight water soluble carrier. Optionally, the particles can comprise from about 35% to about 85%, or even from about 50% to about 80%, by weight of the particles water soluble carrier.

Capsules

The composition of the present disclosure further include a plurality of capsules. As described in more detail below, the capsules may include a core surrounded by substantially inorganic shell.

The capsules may be present in the particles of the composition in an amount that is from about 0.1% to about 20%, or from about 0.2% to about 10%, or from about 0.2% to about 5%, or from about 0.2% to about 3%, by weight of the composition. The composition may comprise a sufficient amount of capsules to provide from about 0.1% to about 20%, or from about 0.2% to about 10%, or from about 0.2% to about 5%, by weight of the composition, of perfume raw materials to the composition. When discussing herein the amount or weight percentage of the capsules, it is meant the sum of the shell material and the core material.

The capsules can have a mean shell thickness of 10 nm to 10,000 nm, optionally 170 nm to 1000 nm, optionally 300 nm to 500 nm.

The capsules can have a mean volume weighted capsule diameter of 0.1 micrometers to 300 micrometers, optionally 10 micrometers to 200 micrometers, optionally 10 micrometers to 50 micrometers. It has been advantageously found that large capsules (e.g., mean diameter of 10 μm or greater) can be provided in accordance with embodiments herein without sacrificing the stability of the capsules as a whole and/or while maintaining good fracture strength.

It has surprisingly been found that in addition to the inorganic shell, the volumetric core-shell ratio can play an important role to ensure the physical integrity of the capsules. Shells that are too thin vs. the overall size of the capsule (core:shell ratio >98:2) tend to suffer from a lack of self-integrity. On the other hand, shells that are extremely thick vs. the diameter of the capsule (core:shell ratio <80:20) tend to have higher shell permeability in a surfactant-rich matrix. While one might intuitively think that a thick shell leads to lower shell permeability (since this parameter impacts the mean diffusion path of the active across the shell), it has surprisingly been found that the capsules of this invention that have a shell with a thickness above a threshold have higher shell permeability. It is believed that this upper threshold is, in part, dependent on the capsule diameter.

The capsules may have a volumetric core-shell ratio of 50:50 to 99:1, optionally from 60:40 to 99:1, optionally 70:30 to 98:2, optionally 80:20 to 96:4.

It may be desirable to have particular combinations of these capsule characteristics. For example, the capsules can have a volumetric core-shell ratio of about 99:1 to about 50:50, and have a mean volume weighted capsule diameter of about 0.1 μm to about 200 μm, and a mean shell thickness of about 10 nm to about 10,000 nm. The capsules can have a volumetric core-shell ratio of about 99:1 to about 50:50, and have a mean volume weighted capsule diameter of about 10 μm to about 200 μm, and a mean shell thickness of about 170 nm to about 10,000 nm. The capsules can have a volumetric core-shell ratio of about 98:2 to about 70:30, and have a mean volume weighted capsule diameter of about 10 μm to about 100 μm, and a mean shell thickness of about 300 nm to about 1000 nm.

Methods according to the present disclosure can produce capsule having a low coefficient of variation of capsule diameter. Control over the distribution of size of the capsules can beneficially allow for the population to have improved and more uniform fracture strength. A population of capsules can have a coefficient of variation of capsule diameter of 40% or less, optionally 30% or less, optionally 20% or less.

For capsules containing a core material to perform and be cost effective in consumer good applications, such as laundry care particle additives, they should: i) be resistant to core diffusion during the shelf life of the liquid product (e.g., low leakage or permeability); ii) have ability to deposit on the targeted surface during application (e.g. washing machine cycle) and iii) be able to release the core material by mechanical shell rupture at the right time and place to provide the intended benefit for the end consumer.

The capsules described herein can have an average fracture strength of 0.1 MPa to 10 MPa, optionally 0.25 MPa to 5 MPa, optionally 0.25 MPa to 3 MPa. Fully inorganic capsules have traditionally had poor fracture strength, whereas for the capsules described herein, the fracture strength of the capsules can be greater than 0.25 MPa, providing for improved stability and a triggered release of the benefit agent upon a designated amount of rupture stress.

In certain embodiments, the mean volume weighted diameter of the capsule is between 1 and 200 micrometers, optionally between 1 and 10 micrometers, optionally between 2 and 8 micrometers. In another embodiment, the shell thickness is between 1 and 10000 nm, 1-1000 nm, 10-200 nm. In a further embodiment, the capsules have a mean volume weighted diameter between 1 and 10 micrometers and a shell thickness between 1 and 200 nm. It has been found, that capsules with a mean volume weighted diameter between 1 and 10 micrometers and a shell thickness between 1 and 200 nm have a higher fracture strength.

Without intending to be bound by theory, it is believed that the higher fracture strength provides a better survivability during the laundering process, wherein the process can cause premature rupture of mechanically weak capsules due to the mechanical constraints in the washing machine.

Capsules having a mean volume weighted diameter between 1 and 10 micrometers and a shell thickness between 10 and 200 nm, offer resistance to mechanical constraints when made with a certain selection of the silica precursor used. In some embodiments, the precursor has a molecular weight between 2 and 5 kDa, optionally a molecular weight between 2.5 and 4 kDa. In addition, the concentration of the precursor needs to be carefully selected, wherein said the concentration is between 20 and 60 w %, preferably between 40 and 60 w % of the oil phase used during the encapsulation.

Without intending to be bound by theory, It is believed that higher molecular weight precursors have a much slower migration time from the oil phase into the water phase. The slower migration time is believed to arise from the combination of 3 phenomenon: diffusion, partitioning, and reaction kinetics. This phenomenon may be important in the context of small sized capsules, due to the fact that the overall surface area between oil and water in the system increases as the capsule diameter decreases. A higher surface area leads to higher migration of the precursor from the oil phase to the water phase, which in turn reduces the yield of polymerization at the interface. Therefore, the higher molecular weight precursor may mitigate the effects brought on by an in increase in surface area, and to obtain capsules according to this invention.

i. Core

The capsules include a core. The core may be oil-based, or the core may be aqueous. Optionally, the core is oil-based. The core may be a liquid at the temperature at which it is utilized in a formulated product. The core may be a liquid at and around room temperature.

The core includes perfume. The core may comprise from about 1 wt % to 100 wt % perfume, based on the total weight of the core. Optionally, the core can include 50 wt % to 100 wt % perfume based on the total weight of the core, optionally 80 wt % to 100 wt % perfume based on the total weight of the core. Typically, higher levels of perfume are preferred for improved delivery efficiency.

The perfume may comprise one or more, optionally two or more, perfume raw materials. The term "perfume raw material" (or "PRM") as used herein refers to compounds having a molecular weight of at least about 100 g/mol and which are useful in imparting an odor, fragrance, essence, or scent, either alone or with other PRMs. Typical PRMs comprise inter alia alcohols, ketones, aldehydes, esters, ethers, nitrites and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994).

The PRMs may be characterized by their boiling points (B.P.) measured at the normal pressure (760 mm Hg), and their octanol/water partition coefficient (P), which may be described in terms of log P, determined according to the test method described in Test methods section. Based on these characteristics, the PRMs may be categorized as Quadrant I, Quadrant II, Quadrant III, or Quadrant IV PRMs, as described in more detail below. A perfume having a variety of PRMs from different quadrants may be desirable, for example, to provide fragrance benefits at different touchpoints during normal usage.

PRMs having a boiling point B.P. lower than about 250° C. and a log P lower than about 3 are known as Quadrant I PRMs. Quadrant 1 PRMs are optionally limited to less than 30% of the perfume composition. PRMs having a B.P. of greater than about 250° C. and a log P of greater than about 3 are known as Quadrant IV PRMs, PRMs having a B.P. of greater than about 250° C. and a log P lower than about 3 are known as Quadrant II PRMs, PRMs having a B.P. lower than about 250° C. and a log P greater than about 3 are known as a Quadrant III PRMs. Suitable Quadrant I, II, III and IV PRMs are disclosed in U.S. Pat. No. 6,869,923 B1.

The perfume may comprise a mixture of at least 3, or even at least 5, or at least 7 PRMs. The perfume may comprise at least 10 or at least 15 PRMs. A mixture of PRMs may provide more complex and desirable aroma, and/or better perfume performance or longevity, for example at a variety of touchpoints. However, it may be desirable to limit the number of PRMs in the perfume to reduce or limit formulation complexity and/or cost.

The perfume may comprise at least one perfume raw material that is naturally derived. Such components may be desirable for sustainability/environmental reasons. Naturally derived PRMs may include natural extracts or essences, which may contain a mixture of PRMs. Such natural extracts or essences may include orange oil, lemon oil, rose extract, lavender, musk, patchouli, balsamic essence, sandalwood oil, pine oil, cedar, and the like. The PRMs may be selected from the group consisting of almond oil, ambrette, angelica seeds oil, armoise oil, basil oil grand vert, benzoin resinoid, bergamot essential oil, bergamot oil, black pepper oil, black pepper essence, black currant essence, blood orange oil, bois des landes, brandy pure jungle essence, cade, camomille romaine he, cardamom guat extract, cardamom oil, carrot heart, caryophyllene extra, cedar, cedarleaf, cedarwood oil, cinnamon bark ceylon, cinnamon ceylan extract, beeswax, citronella, citronellal, clary sage essential oil, clove leaf oil rectified, copaiba balsam, coriander, cos cos anethol, cos cos essence coriandre russie, cucumber extract, cumin oil, cypriol heart, elemi coeur, elemi oil, english white camomile, eucalyptol, *Eucalyptus citriodora*, eugenol, galbanum heart, ginger, grapefruit replacer, guaiacwood oil, gurjum oil, healingwood blo, helichrysum, iso eugenol, jasmine sambac, juniper berry oil, key lime, labdanum resinoid, lavandin abrialis oil, lavandin grosso, lavender essential oil, lemon cedrat, lemon oil, lemon peel verdelli, lemongrass, lemongrass oil, *Litsea cubeba*, magnolia flower oil, mandarin oil yellow, menthol cristalisé, mint piperita cascade, narcisse, neroli oil, nutmeg, orange flower water, orange oil, orange phase oil, organic rose water, osmanthus, patchouli, patchouli heart, patchouli oil, pepper black oil, peppermint, peru balsam absolute, petitgrain t'less, pimento berry oil, pink pepper, raspberry essence, rhodinol, rose, rose centifolia, sandalwood, sichuan pepper extract, styrax white, sweet orange oil, tangerine oil, vanilla, vetiver, violet leaves, violette feuilles, wormwood oil, and combinations thereof.

The core may comprise, in addition to PRMs, a pro-perfume, which can contribute to improved longevity of freshness benefits. Pro-perfumes may comprise nonvolatile materials that release or convert to a perfume material as a result of, e.g., simple hydrolysis, or may be pH-change-triggered pro-perfumes (e.g. triggered by a pH drop) or may be enzymatically releasable pro-perfumes, or light-triggered pro-perfumes. The pro-perfumes may exhibit varying release rates depending upon the pro-perfume chosen.

The core of the encapsulates of the present disclosure may comprise a core modifier, such as a partitioning modifier and/or a density modifier. The core may comprise, in addition to the perfume, from greater than 0% to 80%, optionally from greater than 0% to 50%, optionally from greater than 0% to 30% based on total core weight, of a core modifier. The partitioning modifier may comprise a material selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof. The partitioning modifier may optionally comprise or consist of isopropyl myristate. The modified vegetable oil may be esterified and/or brominated. The modified vegetable oil may optionally comprise castor oil and/or soy bean oil. US Patent Application Publication 20110268802, incorporated herein by reference, describes other partitioning modifiers that may be useful in the presently described perfume encapsulates.

ii. Shell

The capsules of the present disclosure include a shell that surrounds the core.

The shell may include a first shell component. The shell may optionally include a second shell component that surrounds the first shell component. The first shell component can include a condensed layer formed from the condensation product of a precursor. As described in detail below, the precursor can include one or more precursor compounds. The first shell component can include a nanoparticle layer. The second shell component can include inorganic materials.

The shell may be substantially inorganic (defined later). The substantially inorganic shell can include a first shell component comprising a condensed layer surrounding the core and may further comprise a nanoparticle layer surrounding the condensed layer. The substantially inorganic shell may further comprise a second shell component surrounding the first shell component. The first shell component comprises inorganic materials, optionally metal/semi-metal oxides, optionally SiO2, TiO2 and Al2O3, and optionally SiO2. The second shell component comprises inorganic material, optionally comprising materials from the groups of Metal/semi-metal oxides, metals and minerals, optionally materials chosen from the list of $SiO_2$, $TiO_2$, $Al_2O_3$, $ZrO_2$, $ZnO_2$, $CaCO_3$, $Ca_2SiO_4$, $Fe_2O_3$, $Fe_3O_4$, clay, gold, silver, iron, nickel, and copper, optionally chosen from $SiO_2$ and $CaCO_3$. Optionally, the second shell component material is of the same type of chemistry as the first shell component to maximize chemical compatibility.

The first shell component can include a condensed layer surrounding the core. The condensed layer can be the condensation product of one or more precursors. The one or more precursors may comprise at least one compound from the group consisting of Formula (I), Formula (II), and a mixture thereof, wherein Formula (I) is $(M^vO_ZY_n)_w$, and wherein Formula (II) is $(M^vO_zY_nR^1{}_p)_w$. It may be preferred that the precursor comprises only Formula (I) and is free of compounds according to Formula (II), for example so as to reduce the organic content of the capsule shell (i.e., no $R^1$ groups). Formulas (I) and (II) are described in more detail below.

The one or more precursors can be of Formula (I):

$$(M^vO_zY_n)_w \quad \text{(Formula I)},$$

where M is one or more of silicon, titanium and aluminum, v is the valence number of M and is 3 or 4, z is from 0.5 to 1.6, preferably 0.5 to 1.5, each Y is independently selected from —OH, —$OR^2$, —$NH_2$, —$NHR^2$, —$N(R^2)_2$, wherein $R^2$ is a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, n is from 0.7 to (v−1), and w is from 2 to 2000.

The one or more precursors can be of Formula (I) where M is silicon. It may be that Y is —$OR^2$. It may be that n is 1 to 3. It may be preferable that Y is —$OR^2$ and n is 1 to 3. It may be that n is at least 2, one or more of Y is —$OR^2$, and one or more of Y is —OH.

$R^2$ may be $C_1$ to $C_{20}$ alkyl. $R^2$ may be $C_6$ to $C_{22}$ aryl. $R^2$ may be one or more of $C_1$ alkyl, $C_2$ alkyl, $C_3$ alkyl, $C_4$ alkyl, $C_5$ alkyl, $C_6$ alkyl, $C_7$ alkyl, and $C_8$ alkyl. $R^2$ may be $C_1$ alkyl. $R^2$ may be $C_2$ alkyl. $R^2$ may be $C_3$ alkyl. $R^2$ may be $C_4$ alkyl.

It may be that z is from 0.5 to 1.3, or from 0.5 to 1.1, 0.5 to 0.9, or from 0.7 to 1.5, or from 0.9 to 1.3, or from 0.7 to 1.3.

It may be optional that M is silicon, v is 4, each Y is —$OR^2$, n is 2 and/or 3, and each $R^2$ is $C_2$ alkyl.

The precursor can include polyalkoxysilane (PAOS). The precursor can include polyalkoxysilane (PAOS) synthesized via a hydrolytic process.

The precursor can alternatively or further include one or more of a compound of Formula (II):

$$(M^vO_zY_nR^1{}_p)_w \quad \text{(Formula II)},$$

where M is one or more of silicon, titanium and aluminum, v is the valence number of M and is 3 or 4, z is from 0.5 to 1.6, preferably 0.5 to 1.5, each Y is independently selected from —OH, —$OR^2$, halogen,

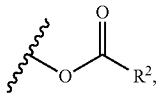

—$NH_2$, —$NHR^2$, —$N(R^2)_2$, and

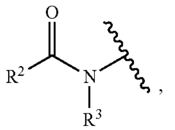

wherein $R^2$ is selected from a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, n is from 0 to (v−1), each $R^1$ is independently selected from a $C_1$ to $C_{30}$ alkyl, a $C_1$ to $C_{30}$ alkylene, a $C_1$ to $C_{30}$ alkyl substituted with one or more of a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl, or a $C_1$ to $C_{30}$ alkylene substituted with one or more of a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl, p is present in an amount up to pmax, and w is from 2 to 2000; and p is a positive number up to pmax, wherein pmax=60/[9*Mw($R^1$)+8], where Mw($R^1$) is the molecular weight of the $R^1$ group.

$R^1$ may be a $C_1$ to $C_{30}$ alkyl substituted with one to four groups independently selected from a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl. $R^1$ may be a $C_1$ to $C_{30}$ alkylene substituted with one to four groups independently selected from a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl.

As indicated above, to reduce or even eliminate organic content in the first shell component, it may be preferred to reduce, or even eliminate, the presence of compounds according to Formula (II), which has R1 groups. The precursor, the condensed layer, the first shell component, and/or the shell may be free of compounds according to Formula (II).

The precursors of formula (I) and/or (II) may be characterized by one or more physical properties, namely a molecular weight (Mw), a degree of branching (DB) and a polydispersity index (PDI) of the molecular weight distribution. It is believed that selecting particular Mw and/or DB can be useful to obtain capsules that hold their mechanical integrity once left drying on a surface and that have low shell permeability in surfactant-based matrices. The precursors of formula (I) and (II) may be characterized as having a DB between 0 and 0.6, preferably between 0.1 and 0.5, optionally between 0.19 and 0.4., and/or a Mw between 600 Da and 100000 Da, preferably between 700 Da and 60000 Da, optionally between 1000 Da and 30000 Da. The characteristics provide useful properties of said precursor in order to obtain capsules of the present invention. The precursors of formula (I) and/or (II) can have a PDI between 1 and 50.

The condensed layer comprising metal/semi-metal oxides may be formed from the condensation product of a precursor comprising at least one compound of formula (I) and/or at least one compound of formula (II), optionally in combination with one or more monomeric precursors of metal/semi-metal oxides, wherein said metal/semi-metal oxides comprise TiO2, Al2O3 and SiO2, preferably SiO2. The monomeric precursors of metal/semi-metal oxides may include compounds of the formula $M(Y)_{V-n}R_n$ wherein M, Y and R are defined as in formula (II), and n can be an integer between 0 and 3. The monomeric precursor of metal/semi-metal oxides may be preferably of the form where M is Silicon wherein the compound has the general formula $Si(Y)_{4-n}R_n$ wherein Y and R are defined as for formula (II) and n can be an integer between 0 and 3. Examples of such monomers are TEOS (tetraethoxy orthosilicate), TMOS (tetramethoxy orthosilicate), TBOS (tetrabutoxy orthosilicate), triethoxymethylsilane (TEMS), diethoxy-dimethylsilane (DEDMS), trimethylethoxysilane (TMES), and tetraacetoxysilane (TAcS). These are not meant to be limiting the scope of monomers that can be used and it would be apparent to the person skilled in the art what are the suitable monomers that can be used in combination herein.

The first shell components can include an optional nanoparticle layer. The nanoparticle layer comprises nanoparticles. The nanoparticles of the nanoparticle layer can be one or more of $SiO_2$, $TiO_2$, $Al_2O_3$, $ZrO_2$, $ZnO_2$, $CaCO_3$, clay, silver, gold, and copper. Optionally, the nanoparticle layer can include $SiO_2$ nanoparticles.

The nanoparticles can have an average diameter between 1 nm and 500 nm, optionally between 50 nm and 400 nm.

The pore size of the capsules can be adjusted by varying the shape of the nanoparticles and/or by using a combination of different nanoparticle sizes. For example, non-spherical irregular nanoparticles can be used as they can have improved packing in forming the nanoparticle layer, which is believed to yield denser shell structures. This can be advantageous when limited permeability is required. The nanoparticles used can have more regular shapes, such as spherical. Any contemplated nanoparticle shape can be used herein.

The nanoparticles can be substantially free of hydrophobic modifications. The nanoparticles can be substantially free of organic compound modifications. The nanoparticles can include an organic compound modification. The nanoparticles can be hydrophilic.

The nanoparticles can include a surface modification such as but not limited to linear or branched $C_1$ to $C_{20}$ alkyl groups, surface amino groups, surface methacrylo groups, surface halogens, or surface thiols. These surface modifications are such that the nanoparticle surface can have covalently bound organic molecules on it. When it is disclosed in this document that inorganic nanoparticles are used, this is meant to include any or none of the aforementioned surface modifications without being explicitly called out.

The capsules of the present disclosure may be defined as comprising a substantially inorganic shell comprising a first shell component and a second shell component. By substantially inorganic it is meant that the first shell component can comprise up to 10 wt %, or up to 5 wt % of organic content, preferably up to 1 wt % of organic content, as defined later in the organic content calculation. It may be preferred that the first shell component, the second shell component, or both comprises no more than about 5 wt %, preferably no more than about 2 wt %, optionally about 0 wt %, of organic content, by weight of the first or shell component, as the case may be.

While the first shell component is useful to build a mechanically robust scaffold or skeleton, it can also provide low shell permeability in liquid products containing surfactants such as laundry detergents, shower-gels, cleansers, etc. (see Surfactants in Consumer Products, J. Falbe, Springer-Verlag). The second shell component can greatly reduce the shell permeability which improves the capsule impermeability in surfactant-based matrices. A second shell component can also greatly improve capsule mechanical properties, such as a capsule rupture force and fracture strength. Without intending to be bound by theory, it is believed that a second shell component contributes to the densification of the overall shell by depositing a precursor in pores remaining in the first shell component. A second shell component also adds an extra inorganic layer onto the surface of the capsule. These improved shell permeabilities and mechanical properties provided by the $2^{nd}$ shell component only occur when used in combination with the first shell component as defined in this invention.

More detailed descriptions of the shell structure, their materials and how these interact with each other to provide optimal performance can be found in U.S. patent application Ser. Nos. 16/851,173, 16/851,176, and 16/851,194, the entirety of those disclosures incorporated herein by reference.

iii. Process of Making Capsules

Capsules of the present disclosure may be formed by first admixing a hydrophobic material with any of the precursors of the condensed layer as defined above, thus forming the oil phase, wherein the oil phase can include an oil-based and/or oil-soluble precursor. Said precursor/hydrophobic material mixture is then either used as a dispersed phase or as a continuous phase in conjunction with a water phase, where in the former case an O/W (oil-in-water) emulsion is formed and in the latter a W/O (water-in-oil) emulsion is formed once the two phases are mixed and homogenized via methods that are known to the person skilled in the art. Preferably, an O/W emulsion is formed. Nanoparticles can be present in the water phase and/or the oil phase, irrespective of the type of emulsion that is desired. The oil phase can include an oil-based core modifier and/or an oil-based benefit agent and a precursor of the condensed layer. Suitable core materials to be used in the oil phase are described earlier in this document.

Once either emulsion is formed, the following steps may occur:

(a) the nanoparticles migrate to the oil/water interface, thus forming the nanoparticle layer.

(b) The precursor of the condensed layer comprising precursors of metal/semi-metal oxides will start undergoing a hydrolysis/condensation reaction with the water at the oil/water interface, thus forming the condensed layer surrounded by the nanoparticle layer. The precursors of the condensed layer can further react with the nanoparticles of the nanoparticle layer.

The precursor forming the condensed layer can be present in an amount between 1 wt % and 50 wt %, preferably between 10 wt % and 40 wt % based on the total weight of the oil phase.

The oil phase composition can include any compounds as defined in the core section above. The oil phase, prior to emulsification, can include between 10 wt % to about 99 wt % benefit agent.

In the method of making capsules according to the present disclosure, the oil phase may be the dispersed phase, and the continuous aqueous (or water) phase can include water, an acid or base, and nanoparticles. The aqueous (or water) phase may have a pH between 1 and 11, preferably between 1 and 7 at least at the time of admixing both the oil phase and the aqueous phase together. The acid can be a strong acid. The strong acid can include one or more of HCl, $HNO_3$, $H_2SO_4$, HBr, HI, $HClO_4$, and $HClO_3$, preferably HCl. The acid can be a weak acid. The weak acid can be acetic acid or HF. The concentration of the acid in the continuous aqueous phase can be between $10^{-7}$M and 5M. The base can be a mineral or organic base, preferably a mineral base. The mineral base can be a hydroxide, such as sodium hydroxide and ammonia. For example, the mineral base can be about $10^{-5}$ M to 0.01M NaOH, or about $10^{-5}$ M to about 1M ammonia. The list of acids and bases and their concentration ranges exemplified above is not meant to be limiting the scope of the invention, and other suitable acids and bases that allow for the control of the pH of the continuous phase are contemplated herein.

In the method of making the capsules according to the present disclosure, the pH can be varied throughout the process by the addition of an acid and/or a base. For example, the method can be initiated with an aqueous phase at an acidic or neutral pH and then a base can be added during the process to increase the pH. Alternatively, the method can be initiated with an aqueous phase at a basic or neutral pH and then an acid can be added during the process to decrease the pH. Still further, the method can be initiated with an aqueous phase at an acid or neutral pH and an acid can be added during the process to further reduce the pH. Yet further the method can be initiated with an aqueous phase at a basic or neutral pH and a base can be added during the process to further increase the pH. Any suitable pH shifts can be used. Further any suitable combinations of acids and bases can be used at any time in the method to achieve a desired pH. Any of the nanoparticles described above can be used in the aqueous phase. The nanoparticles can be present in an amount of about 0.01 wt % to about 10 wt % based on the total weight of the aqueous phase.

The method can include admixing the oil phase and the aqueous phase in a ratio of oil phase to aqueous phase of about 1:10 to about 1:1.

The second shell component can be formed by admixing capsules having the first shell component with a solution of second shell component precursor. The solution of second shell component precursor can include a water soluble or oil soluble second shell component precursor. The second shell component precursor can be one or more of a compound of formula (I) as defined above, tetraethoxysilane (TEOS), tetramethoxysilane (TMOS), tetrabutoxysilane (TBOS), triethoxymethylsilane (TEMS), diethoxy-dimethylsilane (DEDMS), trimethylethoxysilane (TMES), and tetraacetoxysilane (TAcS). The second shell component precursor can also include one or more of silane monomers of type $Si(Y)_{4-n}R_n$ wherein Y is a hydrolysable group, R is a non-hydrolysable group, and n can be an integer between 0 and 3. Examples of such monomers are given earlier in this paragraph, and these are not meant to be limiting the scope of monomers that can be used. The second shell component precursor can include salts of silicate, titanate, aluminate, zirconate and/or zincate. The second shell component precursor can include carbonate and calcium salts. The second shell component precursor can include salts of iron, silver, copper, nickel, and/or gold. The second shell component precursor can include zinc, zirconium, silicon, titanium, and/or aluminum alkoxides. The second shell component precursor can include one or more of silicate salt solutions such as sodium silicates, silicon tetralkoxide solutions, iron sulfate salt and iron nitrate salt, titanium alkoxides solutions, aluminum trialkoxide solutions, zinc dialkoxide solutions, zirconium alkoxide solutions, calcium salt solution, carbonate salt solution. A second shell component comprising $CaCO_3$ can be obtained from a combined use of calcium salts and carbonate salts. A second shell component comprising $CaCO_3$ can be obtained from Calcium salts without addition of carbonate salts, via in-situ generation of carbonate ions from $CO_2$.

The second shell component precursor can include any suitable combination of any of the foregoing listed compounds.

The solution of second shell component precursor can be added dropwise to the capsules comprising a first shell component. The solution of second shell component precursor and the capsules can be mixed together between 1 minute and 24 hours. The solution of second shell component precursor and the capsules can be mixed together at room temperature or at elevated temperatures, such as 20° C. to 100° C.

The second shell component precursor solution can include the second shell component precursor in an amount between 1 wt % and 50 wt % based on the total weight of the solution of second shell component precursor.

Capsules with a first shell component can be admixed with the solution of the second shell component precursor at a pH of between 1 and 11. The solution of the second shell precursor can contain an acid and/or a base. The acid can be a strong acid. The strong acid can include one or more of HCl, $HNO_3$, $H_2SO_4$, HBr, HI, $HClO_4$, and $HClO_3$, preferably HCl. In other embodiments, the acid can be a weak acid. In embodiments, said weak acid can be acetic acid or HF. The concentration of the acid in the second shell component precursor solution can be between $10^{-7}$M and 5M. The base can be a mineral or organic base, preferably a mineral base. The mineral base can be a hydroxide, such as sodium hydroxide and ammonia. For example, the mineral base can be about $10^{-5}$ M to 0.01M NaOH, or about $10^{-5}$ M to about 1M ammonia. The list of acids and bases exemplified above is not meant to be limiting the scope of the invention, and other suitable acids and bases that allow for the control of the pH of the second shell component precursor solution are contemplated herein.

The process of forming a second shell component can include a change in pH during the process. For example, the process of forming a second shell component can be initiated at an acidic or neutral pH and then a base can be added during the process to increase the pH. Alternatively, the process of forming a second shell component can be initiated at a basic or neutral pH and then an acid can be added during the process to decrease the pH. Still further, the process of forming a second shell component can be initiated at an acid or neutral pH and an acid can be added during the process to further reduce the pH. Yet further the process of forming a second shell component can be initiated at a basic or neutral pH and a base can be added during the process to further increase the pH. Any suitable pH shifts can be used. Further any suitable combinations of acids and bases can be used at any time in the solution of second shell component precursor to achieve a desired pH. The process of forming a second shell component can include maintaining a stable pH during the process with a maximum deviation of +/−0.5 pH unit. For example, the process of forming a second shell component can be maintained at a basic, acidic or neutral pH. Alternatively, the process of forming a second shell component can be maintained at a specific pH range by controlling the pH using an acid or a base. Any suitable pH range can be used. Further any suitable combinations of acids and bases can be used at any time in the solution of second shell component precursor to keep a stable pH at a desirable range.

More detailed descriptions of the method of making the capsules and the relevant properties of all shell component precursors (i.e. condensed layer precursors, nanoparticles and second shell component precursors) can be found in U.S. patent application Ser. Nos. 16/851,173, 16/851,176, and 16/851,194, such disclosures in their entirety are defining the method of making of the capsules of the present invention.

Whether making an oil-based core or aqueous core, the emulsion can be cured under conditions to solidify the precursor thereby forming the shell surrounding the core.

The reaction temperature for curing can be increased in order to increase the rate at which solidified capsules are obtained. The curing process can induce condensation of the precursor. The curing process can be done at room temperature or above room temperature. The curing process can be done at temperatures 30° C. to 150° C., preferably 50° C. to 120° C., optionally 80° C. to 100° C. The curing process can be done over any suitable period to enable the capsule shell to be strengthened via condensation of the precursor material. The curing process can be done over a period from 1 minute to 45 days, preferably 1 hour to 7 days, optionally 1 hour to 24 hours. Capsules are considered cured when they no longer collapse. Determination of capsule collapse is detailed below. During the curing step, it is believed that hydrolysis of Y moieties (from formula (I) and/or (II)) occurs, followed by the subsequent condensation of a —OH group with either another —OH group or another moiety of type Y (where the 2 Y moieties are not necessarily the same). The hydrolysed precursor moieties will initially condense with the surface moieties of the nanoparticles (provided they contain such moieties). As the shell formation progresses, the precursor moieties will react with said preformed shell.

The emulsion can be cured such that the shell precursor undergoes condensation. The emulsion can be cured such that the shell precursor reacts with the nanoparticles to undergo condensation. Shown below are examples of the hydrolysis and condensation steps described herein for silica-based shells:

Hydrolysis: $\equiv Si—OR+H_2O \rightarrow \equiv Si—OH+ROH$

Condensation: $\equiv Si—OH+\equiv Si—OR \rightarrow \equiv Si—O—Si\equiv +ROH$ $\equiv Si—OH+\equiv Si—OH \rightarrow \equiv Si—O—Si\equiv +H_2O$.

For example, when a precursor of formula (I) or (II) is used, the following describes the hydrolysis and condensation steps:

Hydrolysis: $\equiv M\text{-}Y+H_2O \rightarrow \equiv M\text{-}OH+YH$

Condensation: $\equiv M\text{-}OH+\equiv M\text{-}Y \rightarrow \equiv M\text{-}O\text{-}M\equiv +YH$ $\equiv M\text{-}OH+\equiv M\text{-}OH \rightarrow \equiv M\text{-}O\text{-}M\equiv +H_2O$.

The capsules may be provided as a slurry composition (or simply "slurry" herein). The result of the methods described herein may be a slurry containing the capsules. The slurry can be formulated into a product, such as a consumer product.

The composition may comprise other perfume capsules. These capsules may be core-shell capsules and may include more than 5 wt % organic material in the shell, by weight of the shell material. Such capsules may be considered “organic” capsules in the present disclosure in order to differentiate them from the inorganic capsules described and claimed herein. The shell material of the organic capsules may comprise a material, preferably a polymeric material, derived from melamine, polyacrylamide, silicones, polystyrene, polyurea, polyurethanes, polyacrylate based materials, gelatin, styrene malic anhydride, polyamides, and mixtures thereof. The organic capsules may be coated with a deposition aid, a cationic polymer, a non-ionic polymer, an anionic polymer, or mixtures thereof. Suitable deposition polymers may be selected from the group consisting of: polyvinylformaldehyde, partially hydroxylated polyvinylformaldehyde, polyvinylamine, polyethyleneimine, ethoxylated polyethyleneimine, polyvinylalcohol, polyacrylates, cationic polysaccharides (such as chitosan), and combinations thereof. The organic capsules may have a volume-weighted mean particle size from about 0.5 microns to about 100 microns, preferably from about 1 microns to about 60 microns, or alternatively a volume weighted mean particle size from about, from about 25 microns to about 60 microns, optionally from about 25 microns to about 60 microns.

Process for Treating Laundry

The process for treating laundry can comprise the steps of: providing an article of laundry in a washing machine; dispensing the composition comprising a plurality of particles into the washing machine; and contacting the article of laundry during a wash sub-cycle of the washing machine with the composition. The washing machine can have a wash sub-cycle and rinse sub-cycle. About 5 g to about 50 g of the composition of particles can be dispensed into the washing machine.

By providing scent benefit through the wash sub-cycle, consumers only need to dose the detergent composition and the composition comprising a plurality of particles to a single location, for example the wash basin, prior to or shortly after the start of the washing machine. This can be more convenient to consumers than using rinse added composition that is separately dispensed into the wash basin after the wash sub-cycle is completed, for example prior to, during, or in between rinse cycles. It can be inconvenient to use auto-dispensing features of modern upright and high efficiency machines since that requires dispensing the rinse added composition to a location other than where detergent composition is dispensed.

Optionally, the process can further comprise the step of contacting the article of clothing during the wash sub-cycle of the washing machine with a detergent composition comprising from about 3% to about 60%, optionally about 3% to about 40%, by weight anionic surfactant. The anionic surfactant can be selected from a sulphate, a sulphonate, a carboxylate, and mixture thereof. The detergent composition differs from the particles. The detergent composition can optionally be provided separate from the particles. The detergent composition can be dispensed separate from the composition comprising a plurality of particles.

Washing machines have at least two basic sub-cycles within a cycle of operation: a wash sub-cycle and a rinse sub-cycle. The wash sub-cycle of a washing machine is the cycle on the washing machine that commences upon first filling or partially filing the wash basin with water. A main purpose of the wash sub-cycle is to remove and or loosen soil from the article of clothing and suspend that soil in the wash liquor. Typically, the wash liquor is drained at the end of the wash sub-cycle. The rinse sub-cycle of a washing machine occurs after the wash sub-cycle and has a main purpose of rinsing soil, and optionally some benefit agents provided to the wash sub-cycle from the article of clothing.

The process can optionally comprise a step of contacting the article of clothing during the wash sub-cycle with a detergent composition comprising an anionic surfactant. Most consumers provide a detergent composition to the wash basin during the wash sub-cycle. Detergent compositions can comprise anionic surfactant, and optionally other benefit agents including but not limited to perfume, bleach, brighteners, hueing dye, enzyme, and the like. During the wash sub-cycle, the benefit agents provided with the detergent composition are contacted with or applied to the article of clothing disposed in the wash basin. Typically, the benefit agents of detergent compositions are dispersed in a wash liquor of water and the benefit agents.

During the wash sub-cycle, the wash basin may be filled or at least partially filled with water. The individual particles of the composition can dissolve or disperse into the water to form a wash liquor comprising the components of the particles. Optionally, if a detergent composition is employed, the wash liquor can include the components of the detergent composition and the components of the particles. The plurality of particles can be placed in the wash basin of the washing machine before the article of clothing is placed in the wash basin of the washing machine. The plurality of particles can be placed in the wash basin of the washing machine after the article of clothing is placed in the wash basin of the washing machine. The plurality of particles can be placed in the wash basin prior to filling or partially filling the wash basin with water or after filling of the wash basin with water has commenced.

If a detergent composition is employed by the consumer in practicing the process of treating an article of clothing, the detergent composition and the particles of the composition can be provided from separate packages. For instance, the detergent composition can be a liquid detergent composition provided from a bottle, sachet, water soluble pouch, dosing cup, dosing ball, or cartridge associated with the washing machine. The particles of the composition can be provided from a separate package, by way of non-limiting example, a carton, bottle, water soluble pouch, dosing cup, sachet, or the like. If the detergent composition is a solid form, such as a powder, water soluble fibrous substrate, water soluble sheet, water soluble film, water soluble film, water insoluble fibrous web carrying solid detergent composition, the particles of the composition can be provided with the solid form detergent composition. For instance, the particles of the composition can be provided from a container containing a mixture of the solid detergent composition and the particles of the composition. Optionally, the particles of the composition can be provided from a pouch formed of a detergent composition that is a water soluble fibrous substrate, water soluble sheet, water soluble film, water soluble film, water insoluble fibrous web carrying solid detergent composition.

Process for Forming Particles

The particles of the composition can be made by a process comprising multiple steps. The particles can be formed by tableting or melt processing. A melt composition can be prepared comprising about 25% to about 99% by weight water soluble carrier and about 0.1% to about 20% by weight capsules.

The particles of the composition can be formed by using a particle making apparatus 11 (FIG. 1). A melt composition 20 can be prepared in a batch mixer 110 or continuous mixer 110 or made on a bench top by hand mixing the component materials. When the carrier is a water soluble polymer, the water soluble polymer can be heated to a temperature that is above the water soluble polymer onset of melt and below the flash point or boiling point of the perfume within the capsule.

A melt composition 20 comprising the water soluble carrier and capsules can be passed through one or more apertures 60 and deposited on a moving conveyor 80 as an extrudate or as droplets 85. The mixture can optionally be deposited into depressions of a mold and cooled or allowed to cool so that the mixture solidifies into the particles 90. The particles can be removed from the depressions of the mold to yield the finished product. A plurality of apertures can be provided in a distributor 30. The melt composition 20 can be transported to the distributor via a feed pipe 40. Optionally a mixer 50, such as a static mixer 55, can be provided in line with the feed pipe 40. Optionally the feed pipe 40 may be insulated or provided with a heated jacket.

Optionally, the particles 90 can be formed by passing a mixture comprising the water soluble carrier and capsules through one or more apertures 60 of a distributor and depositing the mixture on a moving conveyor 80 beneath the one or more apertures 60. The mixture may be solidified to form the particles 90. The mixture may be deposited on the moving conveyor 80 as an extrudate and the extrudate can be cut to form the particles 90. Or the mixture can be passed through the one or more apertures 60 to form droplets on the moving conveyor 80 and the droplets can be solidified to form the particles 90.

Optionally, a gas feed line can be included upstream of the distributor 30 to include gas within the melt composition. Downstream of the gas feed line, the melt composition 30 can be milled to break up the gas bubbles so that the melt is a gas entrained melt. The particles formed from a gas entrained melt can include gas bubbles. The gas feed line and mill can be an integrated unit, by way of nonlimiting example an OAKES FOAMER (E.T. Oakes Corporation, 686 Old Willets Path, Hauppauge, NY 11788) 2MT1A continuous foamer. Optionally gas can be entrained into the melt composition 20 by mixing a gas generating material in the melt composition 20.

Particles

The particles can each have a mass from about 1 mg to about 500 mg, alternatively from about 5 mg to about 500 mg, alternatively from about 5 mg to about 200 mg, alternatively from about 10 mg to about 100 mg, alternatively from about 20 mg to about 50 mg, alternatively from about 35 mg to about 45 mg, alternatively about 38 mg. An individual particle may have a volume from about 0.003 $cm^3$ to about 5 $cm^3$, optionally from about 0.003 $cm^3$ to about 1 $cm^3$, optionally from about 0.003 $cm^3$ to about 0.5 $cm^3$, optionally from about 0.003 $cm^3$ to about 0.2 $cm^3$, optionally from about 0.003 $cm^3$ to about 0.15 $cm^3$. Smaller particles are thought to provide for better packing of the particles in a container and faster dissolution in the wash. The composition can comprise less than 10% by weight of particles having an individual mass less than about 10 mg. This can reduce the potential for dust.

The particles disclosed herein, in any of the embodiments or combination disclosed, can have a shape selected from the group consisting of a sphere, hemisphere, oblate sphere, cylindrical, polyhedral, and oblate hemisphere. The particles may be hemispherical, compressed hemispherical, or have at least one substantially flat or flat surface. Such particles may have relatively high surface area to mass as compared to spherical particles. Dissolution time in water may decrease as a function of increasing surface area, with shorter dissolution time being preferred over longer dissolution time.

The particles disclosed herein can have ratio of maximum dimension to minimum dimension from about 10 to 1, optionally from about 8 to 1, optionally about 5 to 1, optionally about 3 to 1, optionally about 2 to 1. The particles disclosed herein can be shaped such that the particles are not flakes. Particles having a ratio of maximum dimension to minimum dimension greater than about 10 or that are flakes can tend to be fragile such the particles are prone to becoming dusty. The fragility of the particles tends to decrease with decreasing values of the ratio of maximum dimension to minimum dimension.

The particles can comprise about 25% to 99% by weight water soluble carrier and capsules dispersed in the water soluble carrier. The particles can be provided with from about 0.1% to about 20% by weight of the composition capsules.

The particles can comprise less than about 20% by weight anionic surfactant, optionally less than about 10% by weight anionic surfactant, optionally less than about 5% by weight anionic surfactant, optionally less than about 3% by weight anionic surfactant, optionally less than about 1% by weight anionic surfactant. The particles can comprise from 0 to about 20%, optionally from 0 to about 10%, optionally from about 0 to about 5%, optionally from about 0 to about 3%, optionally from about 0 to about 1% by weight anionic surfactant The particles can comprise less than about 10% by weight water.

The particles can comprise bubbles of gas. The bubbles of gas can be spherical bubbles of gas. Since the particles can include bubbles of gas entrained therein, the particles can have a density that is less than the density or weighted average density of the constitutive solid and or liquid materials forming the particles. It can be advantageous for particles that include bubbles of gas to include an antioxidant since the bubbles of gas may contribute to oxidation reactions within the particle. Each of the particles can have a density less than about 1 $g/cm^3$. Optionally, the particles can each have a density less than about 0.98 $g/cm^3$. Optionally, the particles can each have a density less than about 0.95 $g/cm^3$. Since the density of a typical washing solution is about 1 $g/cm^3$, it can be desirable to provide particles that each have a density less than about 1 $g/cm^3$ or even less than about 0.95 $g/cm^3$. Particles that individually have a density less than about 1 $g/cm^3$ can be desirable for providing for particles 90 that float in a wash liquor.

Each of the particles can have a volume and the occlusions of gas within the particles 90 can comprise between about 0.5% to about 50% by volume of the particle, or even between about 1% to about 20% by volume of the particle, or even between about 2% to about 15% by volume of the particle, or event between about 4% to about 12% by volume of the particle. Without being bound by theory, it is thought that if the volume of the occlusions of gas is too great, the particles may not be sufficiently strong to be packaged, shipped, stored, and used without breaking apart in an undesirable manner.

The occlusions can have an effective diameter between about 1 micron to about 2000 microns, or even between about 5 microns to about 1000 microns, or even between about 5 microns to about 200 microns, or even between about 25 to about 50 microns. In general, it is thought that smaller occlusions of gas are more desirable than larger occlusions of gas. If the effective diameter of the occlusions of gas are too large, it is thought that the particles might not be sufficiently strong to be to be packaged, shipped, stored, and used without breaking apart in an undesirable manner. The effective diameter is diameter of a sphere having the same volume as the occlusion of gas. The occlusions of gas can be spherical occlusions of gas.

Dryer Sheet

The capsules can also be practically used in a dryer sheet. A dryer sheet can comprise a nonwoven fibrous layer and a solid fabric softener composition carried on or within said nonwoven fibrous layer. The fabric softener composition can comprise a plurality of capsules dispersed in the solid fabric softener composition. The capsules can be those described herein.

The solid fabric softener composition can comprise a quaternary ammonium compound, optionally an ester quaternary ammonium compound, optionally selected from the group consisting of Di Tallow, Di Methyl Ammonium Methyl Sulfate, N,N-di(oleyi-oxy-ethyl)-N,N-dimethyl ammonium chloride, N,N-di(canolyl-oxy-ethyl)-N,N-dimethyl ammonium chloride, N,N-di(oleyl-oxy-ethyl)-N-methyl, N-(2-hydroxyethyl) ammonium methyl sulfate, N,N-di(canolyl-oxy-ethyl)-N-methyl, N-(2-hydroxyethyl) ammonium methyl sulfate-, N,N-di(oleylamidoethyl)-N-methyl, N-(2-hydroxyethyl) ammonium methyl sulfate, N,N-di(2-oleyloxy oxo-ethyl)-N,N-dimethyl ammonium chloride, N,N-di(2-canolyloxy oxo-ethyl)-N,N-dimethyl ammonium chloride-, N,N-di(2-oleyloxyethylcarbonyloxyethyl)-N,N-dimethyl ammonium chloride, N,N-di(2-canolyloxyethylcarbonyloxyethyl)-N,N-dimethyl ammonium chloride, N-(2-oleyloxy ethyl)-N-(2-oleyloxy oxo-ethyl)-N,N-dimethyl ammonium chloride; N-(2-canolyloxy ethyl)-N-(2-canolyloxy oxo-ethyl)-N,N-dimethyl ammonium chloride, N,N,N-tri(oleyl-oxy-ethyl)-N-methyl ammonium chloride, N,N,N-tri(canolyi-oxy-ethyl)-N-methyl ammonium chloride-, N-(2-oleyloxy oxoethyl)-N-(oleyl)-N,N-dimethyl ammonium chloride, N-(2-canolyloxy oxoethyl)-N-(canolyl)-N,N-dimethyl ammonium chloride, 1,2-dioleyloxy N,N,N-trimethylammoniopropane chloride, and 5,2-dicanolyloxy N,N,N-trimethylammoniopropane chloride, and combinations thereof. In one embodiment, the fabric conditioning active is N,N-di(tallowyl-oxy-ethyl)-N-methyl, N-(2-hydroxyethyl) ammonium methyl sulfate, and mixtures thereof, wherein said fabric softening composition optionally comprises a fatty acid The nonwoven fibrous material can have a basis weight from about 10 g/m$^2$ to about 50 g/m$^2$. The nonwoven fibrous material can be a spun bonded polyester terephthalate, optionally a continuous filament spun bonded terephthalate.

Combinations

Specifically contemplated combinations of the disclosure are herein described in the following lettered paragraphs. These combinations are intended to be illustrative in nature and are not intended to be limiting.

A. A composition comprising a plurality of particles, wherein said particles comprise: about 25% to about 99% by weight water soluble carrier; and
  - a plurality of capsules dispersed in said water soluble carrier, wherein said capsules comprise a core and a shell surrounding said core and said core comprises perfume raw materials;
  - wherein said shell comprises from about 90% to 100%, optionally from about 95% to 100%, optionally from about 99% to 100% by weight of the shell of an inorganic material.

B. The composition according to Paragraph A, wherein said inorganic material is selected from metal oxide, semi-metal oxides, metals, minerals, and mixtures thereof, optionally selected from $SiO_2$, $TiO_2$, $Al_2O_3$, $ZrO_2$, $ZnO_2$, $CaCO_3$, $Ca_2SiO_4$, $Fe_2O_3$, $Fe_3O_4$, clay, gold, silver, iron, nickel, copper, and mixtures thereof, optionally selected from $SiO_2$, $TiO_2$, $Al_2O_3$, $CaCO_3$, and mixtures thereof, optionally $SiO_2$.

C. The composition according to Paragraph A or B, wherein said shell comprises a first shell component comprising a condensed layer and a nanoparticle layer, wherein the condensed layer comprises a condensation product of a precursor, and wherein the nanoparticle layer comprises inorganic nanoparticles, and wherein the condensed layer is disposed between the core and the nanoparticle layer, and a second shell component surrounding the first shell component, wherein the second shell component surrounds the nanoparticle layer.

D. The composition according to any of Paragraphs A to C, wherein said capsules are characterized by one or more of the following:
  - a mean volume weighted capsule diameter of 10 μm to 200 μm, optionally 10 μm to 190 μm;
  - an average shell thickness of 170 nm to 1000 nm;
  - a volumetric core-shell ratio of from about 50:50 to 99:1, optionally 60:40 to 99:1, optionally 70:30 to 98:2, optionally 80:20 to 96:4; and
  - said first shell component comprises no more than 5 wt %, optionally no more than 2 wt %, optionally 0 wt %, of organic content, by weight of the first shell component.

E. The composition according to any of Paragraphs A to D, wherein said shell comprises:
  - a substantially inorganic first shell component comprising a condensed layer and a nanoparticle layer,
  - wherein said condensed layer comprises a condensation product of a precursor,
  - wherein said nanoparticle layer comprises inorganic nanoparticles, and
  - wherein said condensed layer is disposed between said core and said nanoparticle layer; and
  - an inorganic second shell component surrounding said first shell component,
  - wherein said second shell component surrounds said nanoparticle layer;
  - wherein said precursor comprises at least one compound selected from Formula (I), Formula (II), and a mixture thereof;
  - wherein Formula (I) is $(M^vO_zY_n)_w$;
  - wherein Formula (II) is $(M^vO_zY_nR^1_p)_w$;
  - wherein for Formula (I), Formula (II), or the mixture thereof, each M is independently selected from silicon, titanium, and aluminum, v is the valence number of M and is 3 or 4, z is from 0.5 to 1.6, each Y is independently selected from —OH, —OR$^2$, halogen,

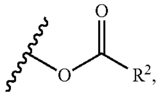

$-NH_2$, $-NHR^2$, $-N(R^2)_2$, and

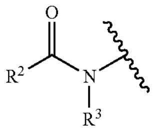, wherein $R^2$ is a $C_1$ to $C_{20}$ alkyl, $C_1$ to $C_{20}$ alkylene, $C_6$ to $C_{22}$ aryl, or a 5-12 membered heteroaryl, wherein said heteroaryl comprises from 1 to 3 ring heteroatoms selected from O, N, and S, wherein $R^3$ is a H, $C_1$ to $C_{20}$ alkyl, $C_1$ to $C_{20}$ alkylene, $C_6$ to $C_{22}$ aryl, or a 5-12 membered heteroaryl, wherein said heteroaryl comprises from 1 to 3 ring heteroatoms selected from O, N, and S, w is from 2 to 2000;

wherein for Formula (I) n is from 0.7 to (v−1); and wherein for Formula (II) n is from 0 to (v−1), each $R^1$ is independently selected from a $C_1$ to $C_{30}$ alkyl, a $C_1$ to $C_{30}$ alkylene, a $C_1$ to $C_{30}$ alkyl substituted with one or more of a halogen, $-OCF_3$, $-NO_2$, —CN, —NC, —OH, —OCN, —NCO, alkoxy, epoxy, amino, mercapto, acryloyl, $CO_2H$, $CO_2$alkyl, aryl, and heteroaryl, and a $C_1$ to $C_{30}$ alkylene substituted with one or more of a halogen, $-OCF_3$, $-NO_2$, —CN, —NC, —OH, —OCN, —NCO, alkoxy, epoxy, amino, mercapto, acryloyl, $CO_2H$, $CO_2$alkyl, aryl, and heteroaryl, and p is a positive number up to pmax, wherein pmax=60/[9*Mw($R^1$)+8], wherein Mw($R^1$) is the molecular weight of the $R^1$ group.

F. The composition according to Paragraph E, wherein said precursor comprises at least one compound according to Formula (I).

G. The composition according to Paragraph F, wherein said precursor is free of compounds according to Formula (II).

H. The composition according to Paragraph E or F, wherein said precursor comprises at least one compound according to Formula (II).

I. The composition according to any of Paragraphs A to H, wherein said plurality of capsules is characterized by one or more of the following:

a mean volume weighted capsule diameter of about 10 μm to about 200 μm;

an mean shell thickness of about 170 nm to about 1000 nm;

a volumetric core-shell ratio of from about 50:50 to 99:1;

said first shell component comprises no more than about 5 wt % of organic content, by weight of said first shell component.

J. The composition according to any of Paragraphs E to I, wherein the compounds of Formula (I), Formula (II), or both are characterized by one or more of the following:

a Polystyrene equivalent Weight Average Molecular Weight (Mw) of from about 700 Da to about 30,000 Da;

a degree of branching of 0.2 to about 0.6;

a molecular weight polydispersity index of about 1 to about 20.

K. The composition according to any of Paragraphs E to J, wherein M is silicon.

L. The composition according to any of Paragraphs E to K, wherein for Formula (I), Formula (II), or both Formula (I) and Formula (II), Y is OR, wherein R is selected from a methyl group, an ethyl group, a propyl group, or a butyl group, optionally an ethyl group.

M. The composition according to any of Paragraphs E to L, wherein said second shell component comprises a material selected from calcium carbonate, silica, and a combination thereof.

N. The composition according to any of Paragraphs E to M, wherein the inorganic nanoparticles of said first shell component comprise at least one of metal nanoparticles, mineral nanoparticles, metal-oxide nanoparticles or semi-metal oxide nanoparticles, optionally wherein the inorganic nanoparticles comprise one or more materials selected from $SiO_2$, $TiO_2$, $Al_2O_3$, $Fe_2O_3$, $Fe_3O_4$, $CaCO_3$, clay, silver, gold, or copper, optionally wherein the inorganic nanoparticles comprise one or more materials selected from $SiO_2$, $CaCO_3$, $Al_2O_3$ and clay.

O. The composition according to any of Paragraphs E to N, wherein the inorganic second shell component comprises at least one of $SiO_2$, $TiO_2$, $Al_2O_3$, $CaCO_3$, $Ca_2SiO_4$, $Fe_2O_3$, $Fe_3O_4$, iron, silver, nickel, gold, copper, or clay, optionally at least one of $SiO_2$ or $CaCO_3$, optionally $SiO_2$.

P. The composition according to any of Paragraphs A to O, wherein said water soluble carrier is a water soluble polymer.

Q. The composition according to any of Paragraphs A to P, wherein said water soluble carrier is selected from:

a polyalkylene polymer of formula $H-(C_2H_4O)_x-(CH(CH_3)CH_2O)_y-(C_2H_4O)_z-OH$ wherein x is from 50 to 300, y is from 20 to 100, and z is from 10 to 200;

a polyethylene glycol fatty acid ester of formula $(C_2H_4O)_q-C(O)O-(CH_2)_r-CH_3$ wherein q is from 20 to 200 and r is from 10 to 30;

a polyethylene glycol fatty alcohol ether of formula $HO-(C_2H_4O)_s-(CH_2)_t)-CH_3$ wherein s is from 30 to 250 and t is from 10 to 30;

C8-C22 alkyl polyalkoxylate comprising more than 40 alkoxylate units;

polyethylene glycol having a weight average molecular weight from 2000 to 15000;

EO/PO/EO block copolymer;

PO/EO/PO block copolymer;

EO/PO block copolymer;

PO/EO block copolymer;

polypropylene glycol;

ethoxylated nonionic surfactant having a degree of ethoxylation greater than 30;

polyvinyl alcohol;

polyalkylene glycol having a weight average molecular weight from 2000 to 15000; and mixtures thereof.

R. The composition according to any of Paragraphs A to Q, wherein said water soluble carrier is polyethylene glycol having a weight average molecular weight from about 2000 to about 15000.

S. The composition according to any of Paragraphs A to R, wherein said water soluble carrier is selected from polyalkylene oxide, polyethylene glycol, sodium acetate, sodium bicarbonate, sodium chloride, sodium silicate, polypropylene glycol polyoxoalkylene, polyethylene glycol fatty acid ester, polyethylene glycol ether, sodium sulfate, starch, and mixtures thereof.

T. The composition according to any of Paragraphs A to S, wherein said plurality of capsules is present at a level of about 0.1% to about 20%, by weight of the composition.

U. The composition according to any of Paragraphs A to T, wherein said particles have at least one flat surface.

V. The composition according to any of Paragraphs A to U, wherein said plurality of particles comprise individual particles, wherein said individual particles have a density less than about 1 $g/cm^3$, optionally less than about 0.98 $g/cm^3$.

W. The composition according to any of Paragraphs A to V, wherein said perfume is a fragrance of plant origin.

X. The composition according to any of Paragraphs A to W, wherein said carrier comprises: from 0% to 3% by weight plasticizer polyol, wherein said plasticizer polyol is optionally a liquid at 20 C and 1 atmosphere of pressure;

from 1% to 20%, optionally 1% to 12%, optionally 6% to 8%, by weight water;

from 45% to 80%, optionally 50% to 70%, optionally 50% to 60%, by weight sugar alcohol polyol selected from erythritol, xylitol, mannitol, isomalt, maltitol, lactitol, trehalose, lactose, tagatose, sucralose, and mixtures thereof;

wherein said particles further comprise:

a. modified starch having a dextrose equivalent from 15 to 20 and said sugar alcohol polyol and said modified starch are present at a weight ratio of said sugar alcohol polyol to said modified starch from 2:1 to 16:1, optionally from 2:1 to 10:1, optionally from 2:1 to 3:1; or b. modified starch having a dextrose equivalent from 4 to less than 15 and said sugar alcohol polyol and said modified starch are present at a weight ratio of said sugar alcohol polyol to said modified starch from 1.5:1 to 16:1, optionally from 1.5:1 to 10:1, optionally from 1.5:1 to 4:1;

wherein said capsules, said water, and said sugar alcohol polyol are dispersed in said modified starch.

Y. The composition according to Paragraph X, wherein said modified starch has a dextrose equivalent from 15 to 20 and said sugar alcohol polyol and said modified starch are present at a ratio from 2:1 to 16:1, optionally from 2:1 to 10:1, optionally from 2:1 to 3:1.

Z. The composition according to Paragraph X, wherein said modified starch has a dextrose equivalent from 4 to less than 15 and said sugar alcohol polyol and said modified starch are present at a weight ratio of said sugar alcohol polyol to said modified starch from 1.5:1 to 16:1, optionally from 1.5:1 to 10:1, optionally from 1.5:1 to 4:1.

AA. The composition according to Paragraph Z, wherein said modified starch has a dextrose equivalent from 4 to 12.

BB. The composition according to any of Paragraphs X to AA, wherein said modified starch is maltodextrin.

CC. The composition according to any of Paragraphs X to BB, wherein said sugar alcohol polyol is mannitol.

DD. The composition according to any of Paragraphs A to W, wherein said carrier comprises:

from 0% to 3% by weight plasticizer polyol that is liquid at 20 C and 1 atmosphere of pressure;

from 1% to 10%, optionally from 3% to 8%, by weight water;

from 15% to 40%, optionally from 20% to 30%, by weight sugar alcohol polyol selected from erythritol, xylitol, mannitol, isomalt, maltitol, lactitol, trehalose, lactose, tagatose, sucralose, and mixtures thereof; and modified starch having a dextrose equivalent from 4 to less than 15 and said sugar alcohol polyol and said modified starch are present at a weight ratio of said sugar alcohol polyol to said modified starch from 1:5 to 1:1;

wherein said capsules, said water, and said sugar alcohol polyol are dispersed in said modified starch; and wherein said particles each have an exterior surface and an anti-caking agent is on said exterior surface.

EE. A process for treating laundry comprising the steps of:

providing an article of laundry in a washing machine;

dispensing said plurality of particles according to any of Paragraphs A to DD into said washing machine; and contacting said article of laundry during a wash sub-cycle of said washing machine with said plurality of particles.

FF. The process according to Paragraph EE further comprising a step of dispensing into said washing machine a laundry detergent comprising from about 3% to about 60% by weight anionic or nonionic surfactant.

GG. The process according to Paragraph EE or FF, wherein about 5 g to about 50 g of said plurality of particles is dispensed into said washing machine.

HH. A process for forming the plurality of particles according to any of Paragraphs A to DD comprising the steps of:

providing a melt composition comprising said water soluble carrier and said capsules;

passing said melt composition through one or more apertures of a distributor; and depositing said melt composition on a moving conveyor beneath said one or more apertures.

II. A dryer sheet comprising:

a nonwoven fibrous layer; and a solid fabric softener composition carried on or within said nonwoven fibrous layer; wherein said solid fabric softener composition comprises a plurality of capsules dispersed in said solid fabric softener composition, wherein said capsules comprise a core and a shell surrounding said core and said core comprises perfume raw materials;

wherein said shell comprises from about 90% to 100%, optionally from about 95% to 100%, optionally from about 99% to 100% by weight of the shell of an inorganic material.

JJ. The dryer sheet according to Paragraphs II, wherein said inorganic material is selected from metal oxide, semi-metal oxides, metals, minerals, and mixtures thereof, optionally selected from $SiO_2$, $TiO_2$, $Al_2O_3$, $ZrO_2$, $ZnO_2$, $CaCO_3$, $Ca_2SiO_4$, $Fe_2O_3$, $Fe_3O_4$, clay, gold, silver, iron, nickel, copper, and mixtures thereof, optionally selected from $SiO_2$, $TiO_2$, $Al_2O_3$, $CaCO_3$, and mixtures thereof, optionally $SiO_2$.

KK. The dryer sheet according to Paragraph II or JJ, wherein said shell comprises a first shell component comprising a condensed layer and a nanoparticle layer, wherein the condensed layer comprises a condensation product of a precursor, and wherein the nanoparticle layer comprises inorganic nanoparticles, and wherein the condensed layer is disposed between the core and the nanoparticle layer, and a second shell component surrounding the first shell component, wherein the second shell component surrounds the nanoparticle layer.

LL. The dryer sheet according to any of Paragraphs II to KK, wherein said shell comprises:

a substantially inorganic first shell component comprising a condensed layer and a nanoparticle layer, wherein said condensed layer comprises a condensation product of a precursor, wherein said nanoparticle layer comprises inorganic nanoparticles, and wherein said condensed layer is disposed between said core and said nanoparticle layer; and an inorganic second shell component surrounding said first shell component, wherein said second shell component surrounds said nanoparticle layer;

wherein said precursor comprises at least one compound selected from Formula (I), Formula (II), and a mixture thereof;

wherein Formula (I) is $(M^vO_zY_n)_w$;

wherein Formula (II) is $(M^vO_zY_nR^1{}_p)_w$;

wherein for Formula (I), Formula (II), or the mixture thereof, each M is independently selected from silicon, titanium, and aluminum, v is the valence number of M and is 3 or 4, z is from 0.5 to 1.6, each Y is independently selected from —OH, —$OR^2$, halogen,

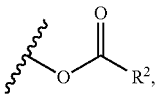

, $NH_2$, —$NHR_2$, —$N(R^2)_2$, and

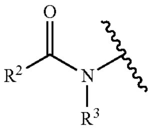

, wherein $R^2$ is a $C_1$ to $C_{20}$ alkyl, $C_1$ to $C_{20}$ alkylene, $C_6$ to $C_{22}$ aryl, or a 5-12 membered heteroaryl, wherein said heteroaryl comprises from 1 to 3 ring heteroatoms selected from O, N, and S, wherein $R^3$ is a H, $C_1$ to $C_{20}$ alkyl, $C_1$ to $C_{20}$ alkylene, $C_6$ to $C_{22}$ aryl, or a 5-12 membered heteroaryl, wherein said heteroaryl comprises from 1 to 3 ring heteroatoms selected from O, N, and S, w is from 2 to 2000;

wherein for Formula (I) n is from 0.7 to (v−1); and wherein for Formula (II) n is from 0 to (v−1), each $R^1$ is independently selected from a $C_1$ to $C_{30}$ alkyl, a $C_1$ to $C_{30}$ alkylene, a $C_1$ to $C_{30}$ alkyl substituted with one or more of a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl, and a $C_1$ to $C_{30}$ alkylene substituted with one or more of a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl, and p is a positive number up to pmax, wherein pmax=60/[9*Mw($R^1$)+8], wherein Mw($R^1$) is the molecular weight of the $R^1$ group.

MM. The dryer sheet according any of Paragraphs II to LL, wherein said solid fabric softener composition comprises a quaternary ammonium compound, optionally an ester quaternary ammonium compound, optionally selected from Di Tallow, Di Methyl Ammonium Methyl Sulfate, N,N-di(oleyi-oxy-ethyl)-N,N-dimethyl ammonium chloride, N,N-di(canolyl-oxy-ethyl)-N,N-dimethyl ammonium chloride, N,N-di(oleyl-oxy-ethyl)-N-methyl, N-(2-hydroxyethyl) ammonium methyl sulfate, N,N-di(canolyl-oxy-ethyl)-N-methyl, N-(2-hydroxyethyl) ammonium methyl sulfate-, N,N-di(oleylamidoethyl)-N-methyl, N-(2-hydroxyethyl) ammonium methyl sulfate, N,N-di(2-oleyloxy oxo-ethyl)-N,N-dimethyl ammonium chloride, N,N-di(2-canolyloxy oxo-ethyl)-N,N-dimethyl ammonium chloride-, N,N-di(2-oleyloxyethylcarbonyloxyethyl)-N,N-dimethyl ammonium chloride, N,N-di(2-canolyloxyethylcarbonyloxyethyl)-N,N-dimethyl ammonium chloride, N-(2-oleyloxy ethyl)-N-(2-oleyloxy oxo-ethyl)-N,N-dimethyl ammonium chloride; N-(2-canolyloxy ethyl)-N-(2-canolyloxy oxo-ethyl)-N,N-dimethyl ammonium chloride, N,N,N-tri(oleyl-oxy-ethyl)-N-methyl ammonium chloride, N,N,N-tri(canolyi-oxy-ethyl)-N-methyl ammonium chloride-, N-(2-oleyloxy oxoethyl)-N-(oleyl)-N,N-dimethyl ammonium chloride, N-(2-canolyloxy oxoethyl)-N-(canolyl)-N,N-dimethyl ammonium chloride, 1,2-dioleyloxy N,N,N-trimethylammoniopropane chloride, and 5,2-dicanolyloxy N,N,N-trimethylammoniopropane chloride, and combinations thereof. In one embodiment, the fabric conditioning active is N,N-di(tallowyl-oxy-ethyl)-N-methyl, N-(2-hydroxyethyl) ammonium methyl sulfate, and mixtures thereof, wherein said fabric softening composition optionally comprises a fatty acid.

NN. The dryer sheet according to any of Paragraphs II to MM, wherein said nonwoven fibrous material has a basis weight from about 10 $g/m^2$ to about 50 $g/m^2$.

OO. The dryer sheet according to any of Paragraphs II to NN, wherein said nonwoven fibrous material is a spun bonded polyester terephthalate, optionally a continuous filament spun bonded terephthalate.

Test Methods

It is understood that the test methods that are disclosed in the Test Methods Section of the present application should be used to determine the respective values of the parameters of Applicant's claimed subject matter as claimed and described herein.

i. Partition Coefficient Method

The partition coefficient, P, is the ratio of concentrations of a compound in a mixture of two immiscible phases at equilibrium, in this case n-Octanol/Water. The value of the log of the n-Octanol/Water partition coefficient (log P) can be measured experimentally using well known means, such as the "shake-flask" method, measuring the distribution of the solute by UV/VIS spectroscopy (for example, as described in "The Measurement of Partition Coefficients", Molecular Informatics, Volume 7, Issue 3, 1988, Pages 133-144, by Dearden J C, Bresnan). Alternatively, the log P can be computed for each PRM in the perfume mixture being tested. The log P of an individual PRM is preferably calculated using the Consensus log P Computational Model, version 14.02 (Linux) available from Advanced Chemistry Development Inc. (ACD/Labs) (Toronto, Canada) to provide the unitless log P value. The ACD/Labs' Consensus log P Computational Model is part of the ACD/Labs model suite.

ii. Mean Shell Thickness Measurement

The capsule shell, including the first shell component and the second shell component, when present, is measured in nanometers on twenty benefit agent containing delivery capsules making use of a Focused Ion Beam Scanning Electron Microscope (FIB-SEM; FEI HELIOS NANOLAB 650) or equivalent. Samples are prepared by diluting a small volume of the liquid capsule dispersion (20 μl) with distilled water (1:10). The suspension is then deposited on an ethanol cleaned aluminium stub and transferred to a carbon coater (LEICA EM ACE600 or equivalent). Samples are left to dry under vacuum in the coater (vacuum level: $10^{-5}$ mbar). Next 25-50 nm of carbon is flash deposited onto the sample to deposit a conductive carbon layer onto the surface. The aluminium stubs are then transferred to the FIB-SEM to prepare cross-sections of the capsules. Cross-sections are prepared by ion milling with 2.5 nA emission current at 30 kV accelerating voltage using the cross-section cleaning pattern. Images are acquired at 5.0 kV and 100 pA in immersion mode (dwell time approx. 10 μs) with a magnification of approx. 10,000.

Images are acquired of the fractured shell in cross-sectional view from 20 benefit delivery capsules selected in a random manner which is unbiased by their size, to create a representative sample of the distribution of capsules sizes present. The shell thickness of each of the 20 capsules is measured using the calibrated microscope software at 3 different random locations, by drawing a measurement line perpendicular to the tangent of the outer surface of the capsule shell. The 60 independent thickness measurements are recorded and used to calculate the mean thickness.

iii. Mean and Coefficient of Variation of Volume-Weighted Capsule Diameter

Capsule size distribution is determined via single-particle optical sensing (SPOS), also called optical particle counting (OPC), using the ACCUSIZER 780 AD instrument or equivalent and the accompanying software CW788 version 1.82 (Particle Sizing Systems, Santa Barbara, California, U.S.A.), or equivalent. The instrument is configured with the following conditions and selections: Flow Rate=1 mL/sec; Lower Size Threshold=0.50 μm; Sensor Model Number=LE400-05SE or equivalent; Auto-dilution=On; Collection time=60 sec; Number channels=512; Vessel fluid volume=50 ml; Max coincidence=9200. The measurement is initiated by putting the sensor into a cold state by flushing with water until background counts are less than 100. A sample of delivery capsules in suspension is introduced, and its density of capsules adjusted with DI water as necessary via autodilution to result in capsule counts of at most 9200 per mL. During a time period of 60 seconds the suspension is analyzed. The range of size used was from 1 μm to 493.3 μm.

Volume Distribution:

$$CoVv\,(\%) = \frac{\sigma_v}{\mu_v} * 100$$

$$\sigma v = \sum_{i=1\,um}^{493.3\,um} (x_{i,v} * (d_i - \mu_v)^2)0.5$$

-continued $$\mu_v = \frac{\sum_{i=1\,um}^{493.3\,um} (x_{i,v} * d_i)}{\sum_{i=1\,um}^{493.3\,um} x_{i,v}}$$

where:

$CoV_v$—Coefficient of variation of the volume weighted size distribution $\sigma_v$—Standard deviation of volume-weighted size distribution $\mu_v$—mean of volume-weighted size distribution $d_i$—diameter in fraction i $x_{i,v}$—frequency in fraction i (corresponding to diameter i) of volume-weighted size distribution $$x_{i,v} = \frac{x_{i,n} * d_i^3}{\sum_{i=1\,um}^{493.3\,um} (x_{i,n} * d_i^3)}$$

iv. Volumetric Core-Shell Ratio Evaluation

The volumetric core-shell ratio values were determined as follows, which relies upon the mean shell thickness as measured by the Shell Thickness Test Method. The volumetric core-shell ratio of capsules where their mean shell thickness was measured is calculated by the following equation:

$$\frac{\text{Core}}{\text{Shell}} = \frac{\left(1 - \frac{2 * \text{Thickness}}{D_{caps}}\right)^3}{\left(1 - \left(1 - \frac{2 * \text{Thickness}}{D_{caps}}\right)^3\right)}$$

wherein Thickness is the mean shell thickness of a population of capsules measured by FIBSEM and the $D_{caps}$ is the mean volume weighted diameter of the population of capsules measured by optical particle counting.

This ratio can be translated to fractional core-shell ratio values by calculating the core weight percentage using the following equation:

$$\%\ \text{Core} = \left(\frac{\frac{\text{Core}}{\text{Shell}}}{1 + \frac{\text{Core}}{\text{Shell}}}\right) * 100$$

and shell percentage can be calculated based on the following equation:

$$\%\ \text{Shell} = 100 - \%\ \text{Core}.$$

Degree of Branching Method

The degree of branching of the precursors was determined as follows: Degree of branching is measured using (29Si) Nuclear Magnetic Resonance Spectroscopy (NMR).

a. Sample Preparation

Each sample is diluted to a 25% solution using deuterated benzene (Benzene-D6 "100%" (D, 99.96% available from Cambridge Isotope Laboratories Inc., Tewksbury, MA, or equivalent). 0.015M Chromium(III) acetylacetonate (99.99% purity, available from Sigma-Aldrich, St. Louis, MO, or equivalent) is added as a paramagnetic relaxation reagent. If glass NMR tubes (Wilmed-LabGlass, Vineland, NJ or equivalent) are used for analysis, a blank sample must also be prepared by filling an NMR tube with the same type of deuterated solvent used to dissolve the samples. The same glass tube must be used to analyze the blank and the sample.

b. Sample Analysis

The degree of branching is determined using a BRUKER 400 MHz Nuclear Magnetic Resonance Spectroscopy (NMR) instrument, or equivalent. A standard silicon (29Si) method (e.g. from Bruker) is used with default parameter settings with a minimum of 1000 scans and a relaxation time of 30 seconds.

c. Sample Processing

The samples are stored and processed using system software appropriate for NMR spectroscopy such as MESTRENOVA version 12.0.4-22023 (available from Mestrelab Research) or equivalent. Phase adjusting and background correction are applied. There is a large, broad, signal present that stretches from −70 to −136 ppm which is the result of using glass NMR tubes as well as glass present in the probe housing. This signal is suppressed by subtracting the spectra of the blank sample from the spectra of the synthesized sample provided that the same tube and the same method parameters are used to analyze the blank and the sample. To further account for any slight differences in data collection, tubes, etc., an area outside of the peaks of interest area should be integrated and normalized to a consistent value. For example, integrate −117 to −115 ppm and set the integration value to 4 for all blanks and samples.

The resulting spectra produces a maximum of five main peak areas. The first peak (Q0) corresponds to unreacted TAOS. The second set of peaks (Q1) corresponds to end groups. The next set of peaks (Q2) correspond to linear groups. The next set of broad peaks (Q3) are semi-dendritic units. The last set of broad peaks (Q4) are dendritic units. When PAOS and PBOS are analyzed, each group falls within a defined ppm range. Representative ranges are described in the following Table 1.

TABLE 1

| Group ID | # of Bridging Oxygen per Silicon | ppm Range |
|---|---|---|
| Q0 | 0 | −80 to −84 |
| Q1 | 1 | −88 to −91 |
| Q2 | 2 | −93 to −98 |
| Q3 | 3 | −100 to −106 |
| Q4 | 4 | −108 to −115 |

Polymethoxysilane has a different chemical shift for Q0 and Q1, an overlapping signal for Q2, and an unchanged Q3 and Q4 as noted in the following Table 2.

TABLE 2

| Group ID | # of Bridging Oxygen per Silicon | ppm Range |
|---|---|---|
| Q0 | 0 | −78 to −80 |
| Q1 | 1 | −85 to −88 |
| Q2 | 2 | −91 to −96 |
| Q3 | 3 | −100 to −106 |
| Q4 | 4 | −108 to −115 |

The ppm ranges indicated in the tables above may not apply to all monomers. Other monomers may cause altered chemical shifts, however, proper assignment of Q0-Q4 should not be affected.

Using MESTRENOVA, each group of peaks is integrated, and the degree of branching can be calculated by the following equation:

$$\text{Degree of Branching} = (1/4) * \frac{3 * Q3 + 4 * Q4}{Q1 + Q2 + Q3 + Q4}$$

d. Molecular Weight and Polydispersity Index Determination Method

The molecular weight (Polystyrene equivalent Weight Average Molecular Weight (Mw)) and polydispersity index (Mw/Mn) of the condensed layer precursors described herein are determined using Size Exclusion Chromatography with Refractive Index detection. Mn is the number average molecular weight.

Sample Preparation

Samples are weighed and then diluted with the solvent used in the instrument system to a targeted concentration of 10 mg/mL. For example, weigh 50 mg of polyalkoxysilane into a 5 mL volumetric flask, dissolve and dilute to volume with toluene. After the sample has dissolved in the solvent, it is passed through a 0.45 um nylon filter and loaded into the instrument autosampler.

Sample Analysis

An HPLC system with autosampler (e.g. WATERS 2695 HPLC Separation Module, Waters Corporation, Milford MA, or equivalent) is connected to a refractive index detector (e.g. WYATT 2414 refractive index detector, Santa Barbara, CA, or equivalent) is used for polymer analysis. Separation is performed on three columns, each 7.8 mm I.D.×300 mm in length, packed with 5 μm polystyrene-divinylbenzene media, connected in series, which have molecular weight cutoffs of 1, 10, and 60 kDA, respectively. Suitable columns are the TSKGEL G1000HHR, G2000HHR, and G3000HHR columns (available from TOSOH Bioscience, King of Prussia, PA) or equivalent. A 6 mm I.D.×40 mm long 5 μm polystyrene-divinylbenzene guard column (e.g. TSKGEL Guardcolumn HHR-L, TOSOH Bioscience, or equivalent) is used to protect the analytical columns. Toluene (HPLC grade or equivalent) is pumped isocratically at 1.0 mL/min, with both the column and detector maintained at 25° C. 100 μL of the prepared sample is injected for analysis. The sample data is stored and processed using software with GPC calculation capability (e.g. ASTRA Version 6.1.7.17 software, available from Wyatt Technologies, Santa Barbara, CA or equivalent.)

The system is calibrated using ten or more narrowly dispersed polystyrene standards (e.g. Standard READYCAL Set, e.g. Sigma Aldrich, PN 76552, or equivalent) that have known molecular weights, ranging from about 0.250-70 kDa and using a third order fit for the Mp verses Retention Time Curve.

Using the system software, calculate and report Weight Average Molecular Weight (Mw) and PolyDispersity Index (Mw/Mn).

v. Method of Calculating Organic Content in First Shell Component

As used herein, the definition of organic moiety in the inorganic shell of the capsules according to the present disclosure is: any moiety X that cannot be cleaved from a metal precursor bearing a metal M (where M belongs to the group of metals and semi-metals, and X belongs to the group of non-metals) via hydrolysis of the M-X bond linking said moiety to the inorganic precursor of metal or semi-metal M and under specific reaction conditions, will be considered as organic. A minimal degree of hydrolysis of 1% when exposed to neutral pH distilled water for a duration of 24 h without stirring, is set as the reaction conditions.

This method allows one to calculate a theoretical organic content assuming full conversion of all hydrolysable groups. As such, it allows one to assess a theoretical percentage of organic for any mixture of silanes and the result is only indicative of this precursor mixture itself, not the actual organic content in the first shell component. Therefore, when a certain percentage of organic content for the first shell component is disclosed anywhere in this document, it is to be understood as containing any mixture of unhydrolyzed or pre-polymerized precursors that according to the below calculations give a theoretical organic content below the disclosed number.

The immediately following example calculation is for silane. The calculation for the general case follows thereafter.

Consider a mixture of silanes, with a molar fraction $Y_i$ for each, and where i is an ID number for each silane. Said mixture can be represented as follows:

$$Si(XR)_{4-n}R_n$$

where XR is a hydrolysable group under conditions mentioned in the definition above, $R^i_{ni}$ is non-hydrolyzable under conditions mentioned above and $n_i$=0, 1, 2 or 3.

Such a mixture of silanes will lead to a shell with the following general formula:

$$SiO_{\frac{(4-n)}{2}}R_n$$

Then, the weight percentage of organic moieties as defined earlier can be calculated as follows:

1) Find out Molar fraction of each precursor (nanoparticles included)
2) Determine general formula for each precursor (nanoparticles included)
3) Calculate general formula of precursor and nanoparticle mixture based on molar fractions
4) Transform into reacted silane (all hydrolysable groups to oxygen groups)
5) Calculate weight ratio of organic moieties vs. total mass (assuming 1 mole of Si for framework)

An example calculation is shown in Table 3.

TABLE 3

| Raw material | Formula | Mw (g/mol) | weight (g) | amount (mmol) | Molar fraction |
|---|---|---|---|---|---|
| Sample AY | $SiO(OEt)_2$ | 134 | 1 | 7.46 | 0.57 |
| TEOS | $Si(OEt)_4$ | 208 | 0.2 | 0.96 | 0.07 |
| DEDMS | $Si(OEt)_2Me_2$ | 148.27 | 0.2 | 1.35 | 0.10 |
| SiO2 NP | $SiO_2$ | 60 | 0.2 | 3.33 | 0.25 |

To calculate the general formula for the mixture, each atoms index in the individual formulas is to be multiplied by their respective molar fractions. Then, for the mixture, a sum of the fractionated indexes is to be taken when similar ones occur (typically for ethoxy groups).

Note: Sum of all Si fractions will always add to 1 in the mixture general formula, by virtue of the calculation method (sum of all molar fractions for Si yields 1).

$$SiO_{1*0.57+2*0.25}(OEt)_{2*0.574*0.072*0.10}Me_{2*0.10}$$

$$SiO_{1.07}(OEt)_{1.62}Me_{0.20}$$

To transform the unreacted formula to a reacted one, simply divide the index of ALL hydrolysable groups by 2, and then add them together (with any pre-existing oxygen groups if applicable) to obtain the fully reacted silane.

$$SiO_{1.88}Me_{0.20}$$

In this case, the expected result is $SiO_{1.9}Me_{0.2}$, as the sum of all indexes must follow the following formula:

$$A+B/2=2,$$

where A is the oxygen atom index and B is the sum of all non-hydrolysable indexes. The small error occurs from rounding up during calculations and should be corrected. The index on the oxygen atom is then readjusted to satisfy this formula.

Therefore, the final formula is $SiO_{1.9}Me_{0.2}$, and the weight ratio of organic is calculated below:

$$\text{Weight ratio}=(0.20*15)/(28+1.9*16+0.20*15)=4.9\%$$

General Case

The above formulas can be generalized by considering the valency of the metal or semi-metal M, thus giving the following modified formulas:

$$M(XR)_{V-ni}R^i_{ni}$$

and using a similar method but considering the valency V for the respective metal.

EXAMPLES

The examples provided below are intended to be illustrative in nature and are not intended to be limiting.

Example 1. Non-Hydrolytic Precursor Synthesis 1000 g of tetraethoxysilane (TEOS, available from Sigma Aldrich) was added to a clean dry round bottom flask equipped with a stir bar and distillation apparatus under nitrogen atmosphere. 490 ml of acetic anhydride (available from Sigma Aldrich) and 5.8 g of tetrakis(trimethylsiloxy) titanium (available from Gelest) is added and the contents of the flask were stirred for 28 hours at 135° C. During this time, the ethyl acetate generated by reaction of the ethoxy silane groups with acetic anhydride was distilled off. The reaction flask was cooled to room temperature and was placed on a rotary evaporator (BUCHI ROTOVAPOR R110), used in conjunction with a water bath and vacuum pump (WELCH 1402 DUOSEAL) to remove any remaining solvent and volatile compounds. The polyethoxysilane (PEOS) generated was a yellow viscous liquid with the following specifications found in Table 4. The ratio of TEOS to acetic anhydride can be varied to control the parameters presented in Table 4.

TABLE 4

| Parameters of PEOS | Results |
|---|---|
| Degree of branching (DB) | 0.26 |
| Molecular weight (Mw) | 1.2 |
| Polydispersity index (PDI) | 3.9 |

Example 2. Silica Shell-Based Perfume Capsules

The oil phase was prepared by mixing and homogenizing a precursor with a benefit agent and/or a core modifier (one part of non-hydrolytic precursor to two parts of benefit agent and/or core modifier). The water phase was prepared by adding 1.25 w % AEROSIL 300 (available from Evonik) in a 0.1M HCl aqueous solution, dispersed with an ultrasound bath for at least 30 minutes. Once each phase was prepared separately, they were combined (one part of oil phase to four parts of water), and the oil phase was dispersed into the water phase with IKA ULTRATURRAX S25N-10G mixing tool at 13400 RPM per 1 minute. Once the emulsification step was complete, the resulting emulsion was cured with the following temperature profile: 4 h at 22° C., 16 h at 50° C. and 96 h at 70° C. To deposit a second shell component, the capsules receive a post-treatment with a second shell component solution: the slurry was diluted 2 times in 0.1M HCl and treated with a controlled addition (40 μl per minute, 0.16 ml per g of slurry) of a 10 wt % sodium silicate aqueous solution, using a suspended magnetic stirrer reactor at 250 RPM, at 22° C. The pH was kept constant at pH 7 using a 1M HCl(aq). After the infusion of the second shell component solution finished, the capsules were centrifuged for 10 minutes at 2500 rpm and re-dispersed in de-ionized water. The capsule population had a mean size of 29.22 μm and the CoV 38%.

Figure 2:
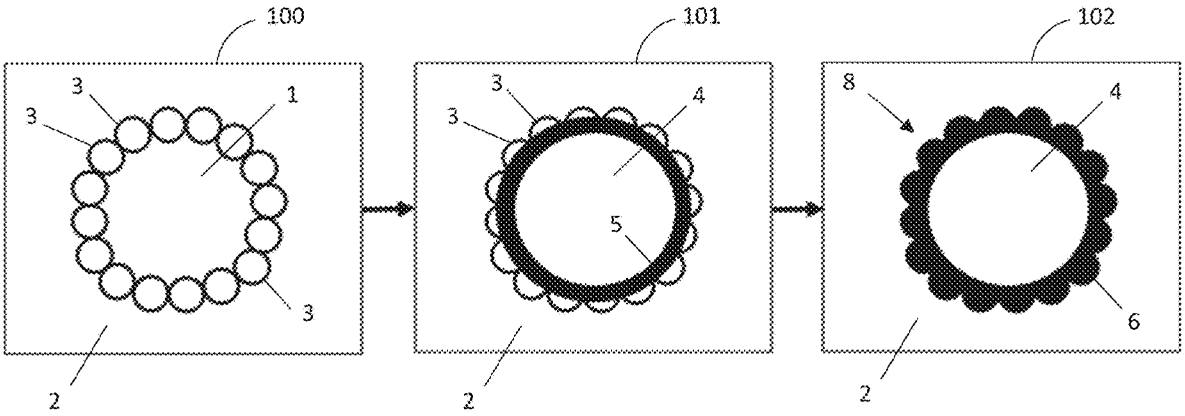
FIG. 2 shows a schematic illustration of the method of making capsules with a first shell component, prepared with a hydrophobic core.

FIG. 2 shows a schematic illustration of the method of making capsules 8 with a first shell component 6, prepared with a hydrophobic core 4. For example, in the first box 100, an oil phase 1 is provided to an aqueous phase 2. The oil phase 2 comprises a hydrophobic benefit agent, such as one or more perfume raw materials, as well as a liquid precursor material. Nanoparticles 3 have surrounded the oil phase 1, for example forming a Pickering emulsion. In the second box 101, a hydrolyzed precursor 5 begins to form at the interface around a core 4, where the core 4 comprises an oil phase that includes the benefit agent. In the third box 102, a first shell component 6 has formed around the core 4, where the first shell component is formed from the nanoparticles 3 and the hydrolyzed precursor 5.

Figure 3:
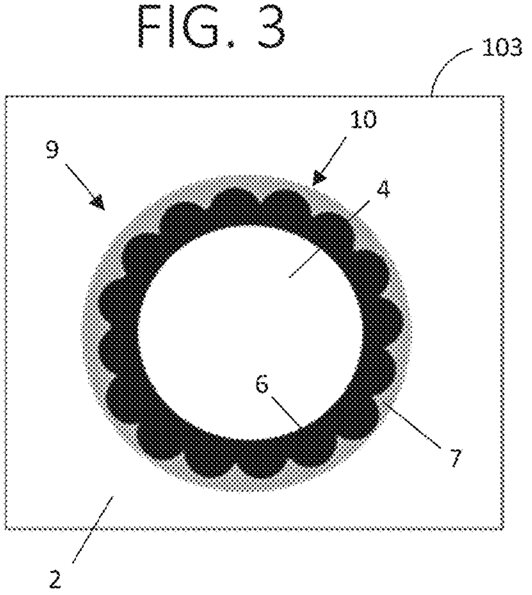
FIG. 3 shows a schematic illustration of a capsule with a first shell component and a second shell component.
Figure 4:
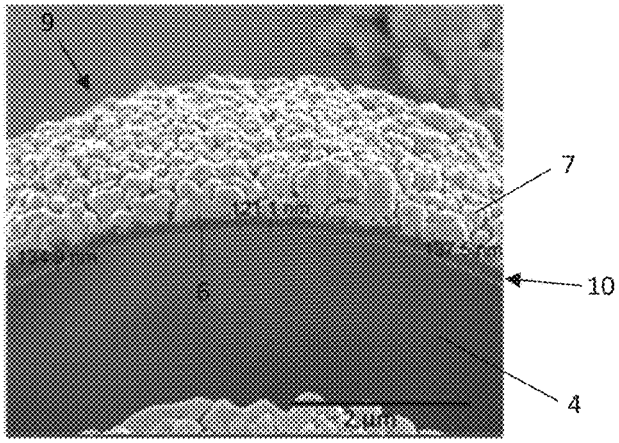
FIG. 4 is a scanning electron microscopy image of a capsule.

FIG. 3 shows a schematic illustration in box 103 of a capsule 9 with a shell 10, the shell 10 having a first shell component 6 and a second shell component 7, around a core 4. The capsule 9 is shown in an aqueous phase 2. The core 4 comprises one or more perfume raw materials. FIG. 4 shows a scanning electron microscopy image of such a capsule 9 in cross-section. A core 4 is surrounded by shell 10, where the shell 10 includes a first shell component 6 surrounded by a second shell component 7.

Figure 5:
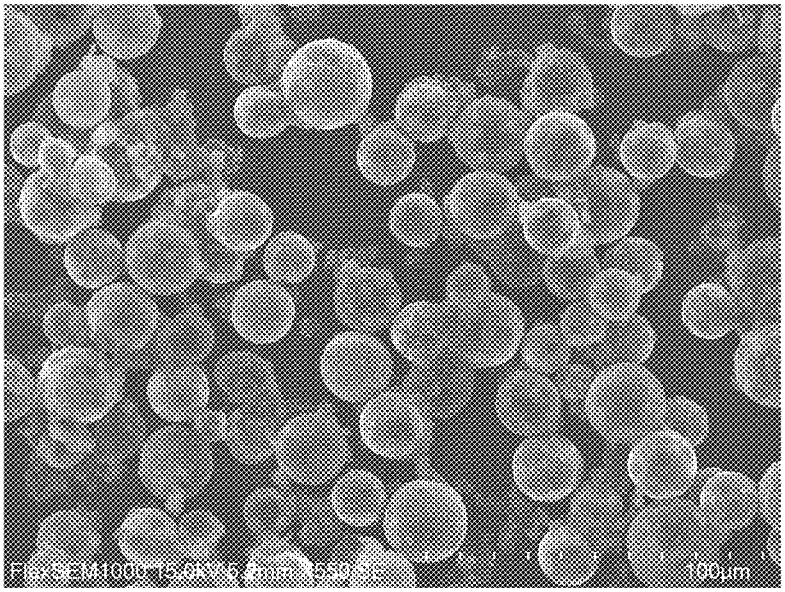
FIG. 5 is a population of capsules according to the present disclosure.

FIG. 5 shows a scanning electron microcopy image of a population of silica shell-based perfume capsules as described in the present disclosure.

Example 3. Exemplary Particle Formulations

Two unique specimens of particles were prepared, one containing silica shell-based perfume capsules (Inventive Example 3A) and another one containing polyacrylate shell-based perfume capsules (Comparative Example 3B). The general procedure for preparing the particles involved setting a hot plate to a temperature of 85° C., weighing out the beaker on the hot plate and bringing the contents to temperature, and thereafter hand pipetting the mixture into a mold for making uniform sized particles and allowing to cool. The individual particles so formed were of a size such that four of such particles weighed approximately 0.140-0.145 g. The composition of the two particles are shown in the Table 5 below.

Inventive Example 3A, below (Table 5), was a population of perfume capsules was prepared encapsulating the mixture of perfume raw materials "Perfume 1" in accordance to Table 5 below. The capsules of the population comprised a silica-based first shell component and a second shell component, according to the present disclosure.

Comparative Example 3B, below (Table 5), was a population of perfume capsules comprising a polyacrylate shell, encapsulating the same mixture of perfume raw material ("Perfume 1"), according to encapsulates made according to the processes disclosed in PCTUS Publication No. WO2020/117996.

TABLE 5

| Ingredients (All levels are in weight percent of the composition.) | Inventive Example 3A | Comparative Example 3B |
|---|---|---|
| Polyethylene glycol (PLURIOL E8000 from BASF) | 87.26 | 87.26 |
| Dipropylene glycol | — | 3.82 |
| Cyan 15 dye solution | 0.012 | 0.012 |
| Perfume oil in silica shell perfume capsules (not inclusive of shell) | 2.7 | — |
| Perfume oil in polyacrylate shell perfume capsules (not inclusive of shell) | | 2.7 |
| water | Add to 100-minus shell | Add to 100-minus shell |

The Inventive Example 3A and Comparative Example 3B were tested under in-use conditions with fabric to determine wet fabric headspace and the dry fabric headspace. A MIELE HONEYCOMB CARE W1724 washing machine was used and the cycle settings were express cycle program at 30° C., 1000 RPM for 30 min. The fabric used in testing was 420 g of terry cotton test fabrics, Each of the 14 pieces of terry cotton test fabric was 30 cm by 15 cm and had a mass of 30 g. Also included in the testing was a ballast load. The ballast load was 1369 g of CALDERON cotton (10 pieces) and 1220 g of Calderon polyester-cotton (10 pieces). Each of the 10 pieces of CALDERON cotton was 52 cm by 42 cm and had a mass of 137 g. Each of the 10 pieces of CALDERON polyester-cotton was 46 cm by 46 cm and had a mass of 122 g. The particles and liquid detergent were delivered to the drum of the machine at the designated level: 9 g of particles on the bottom of the drum, before loading the fabrics, and 58.47 g of the liquid detergent formulation in Table 6 below. The liquid detergent was dosed on top of the fabric. After the wash, samples of terry cotton test fabrics were obtained for Wet Fabric Headspace Testing and the remainder of the terry cotton test fabrics were line-dried per 24 hours at controlled temperature and humidity (22° C./50% rH).

TABLE 6

Liquid Detergent

| Component | Level [% active] |
|---|---|
| Water | Balance |
| Alkyl ether sulfate | 3.93 |
| Dodecyl benzene sulphonic acid | 14.84 |

TABLE 6-continued

| Liquid Detergent | |
|---|---|
| Component | Level [% active] |
| Ethoxylated alcohol | 3.83 |
| Amine oxide | 0.51 |
| Fatty acid | 1.73 |
| Citric acid | 0.54 |
| Sodium diethylene triamine penta methylene phosphonic acid | 0.512 |
| Calcium chloride | 0.37 |
| Ethanol | 0.42 |
| Ethoxysulfated hexamethylene diamine quaternized | 0.66 |
| Co-polymer of polyethylene glycol and vinyl acetate | 1.27 |
| 1,2-benzisothiazolin-3-one and 2-methyl-4-isothiazolin-3-one | 0.05 |
| Ethanol | 0.42 |
| Sodium cumene sulphonate | 1.724 |
| NaOH | 1.65 |
| Hydrogenated castor oil structurant | 0.3 |
| Silicone emulsion | 0.135 |
| Dye | 0.0056 |
| Optical brightener | 0.046 |
| Enzyme | 0.033 |

A perfume headspace analysis was conducted on the terry cotton test fabrics immediately following the washing cycle (Wet Fabric Headspace, WFHS), with the terry cotton test fabrics still being wet. Six 4 cm×4 cm samples of the terry cotton test fabrics per wash test were analyzed by fast headspace GC/MS. Each 4×4 cm sample of the terry cotton test fabric was transferred to a 25 mL headspace vial. The samples of the terry cotton test fabrics were equilibrated for 10 minutes at 65° C. The headspace above the samples of the terry cotton test fabrics was sampled using the SPME (50/30 μm DVB/Carboxen/PDMS) approach for 5 minutes. The SPME fiber was subsequently on-line thermally desorbed into the GC. The analytes were analyzed by fast GC/MS in full scan mode. Ion extraction of the specific masses of the perfume raw materials were used to calculate the total headspace response (expressed in nmol/l). After the terry cotton test fabrics were line dried for 24 hours at controlled temperature and humidity (22° C./50% rH), the dry terry cotton test fabrics were tested in the same manner with the only difference being the terry cotton test fabrics were dry (Dry Fabric Headspace, DFHS), rather than wet.

Figure 6:
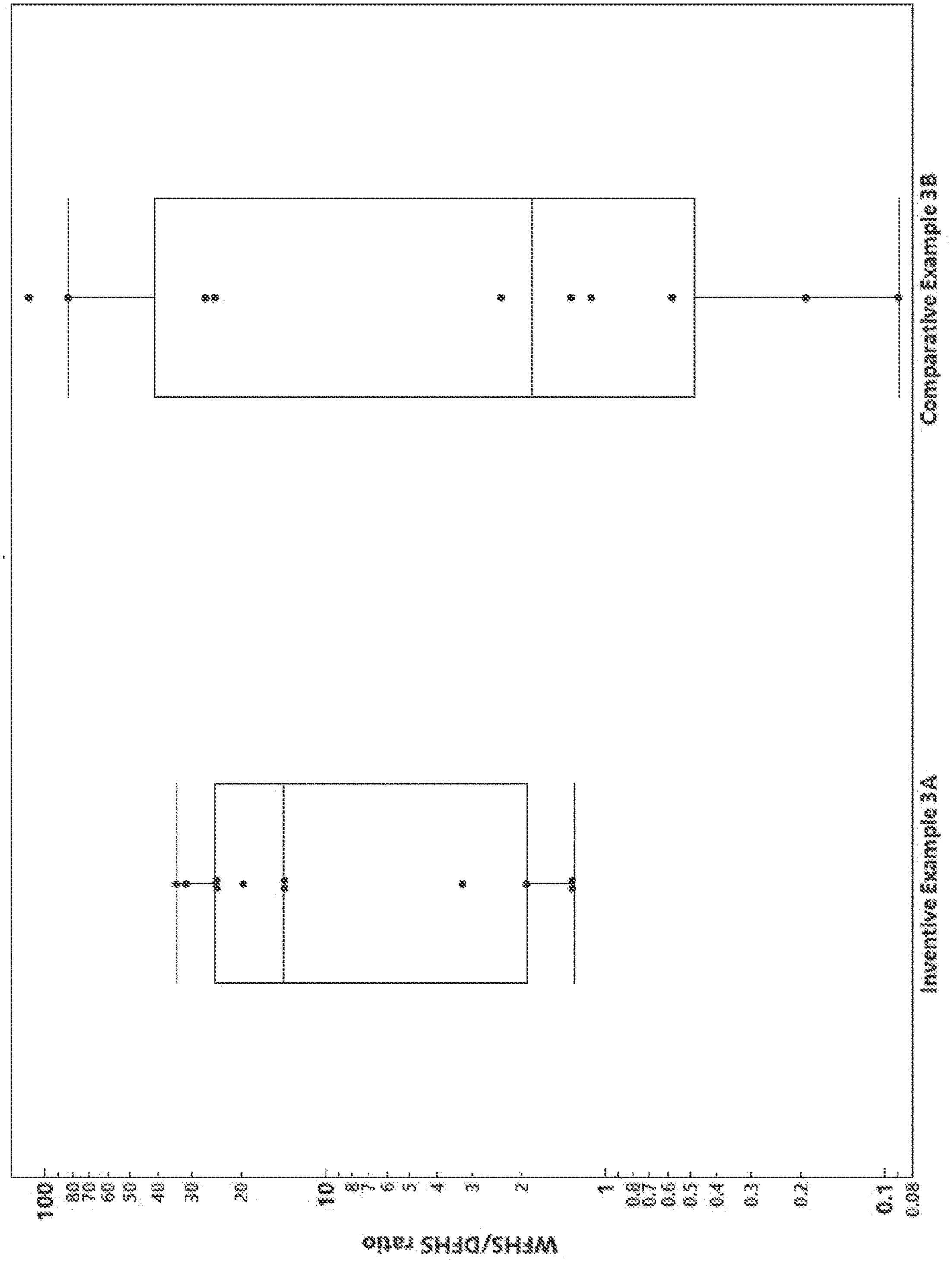
FIG. 6 is a box plot of the WFHS/DFHS ratio measured as described in Example 3.

The particles of Inventive Example 3A and Comparative Example 3B each provided the same mass of perfume. The Wet Fabric Headspace (WFHS) and Dry Fabric Headspace (DFHS) for each individual perfume raw material was measured. For each perfume raw material, the ratio of WFHS/DFHS was calculated (see Table 7). The relative Standard Deviation of WFHS/DFHS was also calculated for Inventive Example 3A and the Comparative Example 3B. As shown in FIG. 6 (box plot of illustrating median line, 1$^{st}$ and 3$^{rd}$ quartiles at edges of box, and maximum and minimum whiskers), the capsules according to Inventive Example 3A had a lower relative standard deviation of headspace ratio compared to Comparative Example 3B. This indicates a more consistent perfume character between wet fabrics and dry fabrics for capsules of Inventive Example 3A compared to Comparative Example 3B.

TABLE 7

| Perfume Raw Material | CAS# | logP | Inventive Example 3 A | Comparative Example 3B |
|---|---|---|---|---|
| Ethyl 2-methyl butyrate | 7452-79-1 | 2.16 | 1.30 | NA |
| Eucalyptol | 470-82-6 | 2.74 | 1.31 | 0.58 |
| 2,4-dimethylcyclohex-3-ene-1-carbaldehyde Isomer 1 | 68039-49-6 | 2.34 | 1.90 | 0.09 |
| 2,4-dimethylcyclohex-3-ene-1-carbaldehyde Isomer 2 | 27939-60-2 | 2.34 | 3.23 | 0.19 |
| Tetrahydro myrcenol | 18479-57-7 | 3.54 | 19.62 | 82.64 |
| Tetrahydro linalool | 78-69-3 | 3.48 | 14.21 | 26.84 |
| Iso-Bornyl acetate | 125-12-2 | 3.60 | 13.71 | 1.32 |
| (2-tert-butylcyclohexyl) acetate | 88-41-5 | 4.23 | 23.78 | 1.12 |
| (4-tert-butylcyclohexyl) acetate | 32210-23-4 | 4.23 | 31.39 | 2.35 |
| Verdyl acetate | 5413-60-5 | 3.63 | 34.05 | 24.82 |
| Beta-Naphthyl methyl ether | 93-04-9 | 3.47 | 24.89 | 114.02 |
| | | Average: | 16.62 | 28.20 |
| | | Relative Standard Deviation | 0.74 | 1.48 |

Example 4. Exemplary Particle Formulations are Provided Below in Table 8

TABLE 8

| | % Active (w/w) Composition | | | | | | | | |
|---|---|---|---|---|---|---|---|---|---|
| Ingredient | 4A | 4B | 4C | 4D | 4E | 4F | 4G | 4H | 4I |
| Polyethylene glycol having a weight average molecular weight of 9000 | 60 | 80 | — | 55 | 75 | — | 89.26 | 87.27 | 82.26 |
| Cyan 15 dye solution | — | — | — | — | — | — | 0 | 0 | 0.012 |
| Unencapsulated perfume oil | — | — | — | 7.5 | 5 | 6 | 7.5 | 7.5 | 8 |
| Modified starch, maltodextrin M100 | — | — | 17 | — | — | 15.74 | — | — | — |
| Sugar alcohol polyol selected from the group consisting of mannitol, maltitol, erythritol, isomalt, sorbitol, and mixtures thereof | — | — | 54 | — | — | 50 | — | — | — |
| Water | To 100 | To 100 | To 100 | To 100 | To 100 | To 100 | To 100 | To 100 | To 100 |
| Perfume capsules (perfume oil plus shell) | 2 | 3 | 2.5 | 2 | 3 | 2.5 | 0.7 | 2.7 | 2.7 |
| Starch and or sodium sulfate | 35 | 14 | 9.5 | 35 | 15 | 9.5 | — | — | — |

Example 5

Non-hydrolytic PEGS synthesis: 1000 gr of TEOS (available from Sigma Aldrich) was added to a clean dry round bottom flask equipped with a stir bar and distillation apparatus under nitrogen atmosphere. Next, 564 gr of acetic anhydride (available from Sigma Aldrich) and 5.9 gr of tetrakis(trimethylsiloxide) titanium (available from Gelest, Sigma Aldrich) were added and the contents of the flask and heated to 135 C under stirring. The reaction temperature was maintained at 135 C under vigorous stirring for 30 hours, during which the organic ester generated by reaction of the alkoxy silane groups with acetic anhydride was distilled off along with additional organic esters generated by the condensation of silyl-acetate groups with other alkoxysilane groups which occurred as the polyethoxysilane (PEGS) was generated. The reaction flask was cooled to room temperature and placed on a rotary evaporator (BUCHI ROTOVAPOR R110), used in conjunction with a water bath and vacuum pump (WELCH 1402 DUOSEAL) to remove any remaining solvent. The degree of branching (DB), molecular weight (Mw) and polydispersity index (PDI) of the PEOS polymer synthetized were respectively 0.42, 2.99 and 2.70.

Capsule synthesis: Five batches were made following the procedure below, and after the curing step, the 5 batches were combined to yield a combined slurry. The oil phase was prepared by mixing and homogenizing (or even dissolving if all compounds are miscible) 3 g of the PEOS precursor synthesized above with 2 g of a benefit agent and/or a core modifier, here a fragrance oil. 100 gr of water phase was prepared by mixing 0.5 g of NaCl, 3.5 gr of AEROSIL 300 fumed silica from EVONIK and 96 gr of DI water. The fumed silica was dispersed in the aqueous phase with an IKA ULTRA-TURRAX (S25N) at 20000 RPM for 15 min. Once each phase was prepared separately, 5 g of the oil phase was dispersed into 16 g of the water phase with an IKA ULTRA-TURRAX mixer (S25N-10 g) at 25000 RPM for 5 minutes to reach a desired mean oil droplet diameter. Then the pH was brought to 1 using HCl 0.1M added dropwise. Once the emulsification step was complete, the resulting emulsion was left resting without stirring for 4 hours at room temperature, and then 16 hours at 90° C. until enough curing had occurred for the capsules to not collapse. The five batches were combined after the curing step, to obtain a combined capsule slurry.

To deposit a second shell component, the combined capsule slurry received a post-treatment with a second shell component solution. 50 g of the combined slurry was diluted with 50 g of 0.1M HCl(aq). The pH was adjusted to 7 using 1M NaOH(aq) added dropwise. Then, the diluted slurry was treated with a controlled addition (40 µl per minute) of the second shell component precursor solution (20 ml of 15 w % of Sodium silicate(aq.)), using a suspended magnetic stirrer reactor at 300 RPM, at room temperature. The pH was kept constant at pH 7 by continuously infusing 1.6M HCl (aq) and 1M NaOH(aq) solutions. Then the capsules were centrifuged per 10 minutes at 2500 RPM. The supernatant was discarded, and the capsules were re-dispersed in de-ionized water.

To test whether capsules collapse, the slurry was diluted 10 times into de-ionized water. Drops of the subsequent dilution were added to a microscopy microslide and left to dry overnight at room temperature. The following day, the dried capsules were observed under an optical microscope by light transmission to assess if the capsules have retained their spherical shape (without the use of a cover slide). The capsules survived drying and didn't collapse. The mean volume weighted diameter of the capsules measured was 5.3 μm with a CoV of 46.2%. The percentage of organic content in the shell was 0%.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition comprising a plurality of individual particles, wherein said individual particles comprise:

about 25% to about 99% by weight water soluble carrier; and a plurality of capsules dispersed in said water soluble carrier, wherein said capsules comprise a core and a shell surrounding said core and said core comprises perfume raw materials;

wherein said shell comprises from about 90% to 100% by weight of said shell of an inorganic material.

2. The composition according to claim 1, wherein said inorganic material is selected from metal oxide, semi-metal oxides, metals, minerals, and mixtures thereof.

3. The composition according to claim 1, wherein said shell comprises a first shell component comprising a condensed layer and a nanoparticle layer, wherein said condensed layer comprises a condensation product of a precursor, and wherein said nanoparticle layer comprises inorganic nanoparticles, and wherein said condensed layer is disposed between said core and said nanoparticle layer, and a second shell component surrounding said first shell component, wherein said second shell component surrounds said nanoparticle layer.

4. The composition according to claim 1, wherein said capsules are characterized by one or more of the following:

a mean volume weighted capsule diameter of 10 μm to 200 μm;

an average shell thickness of 170 nm to 1000 nm;

a volumetric core-shell ratio of from about 50:50 to 99:1; and the first shell component comprises no more than 5 wt % of organic content, by weight of the first shell component.

5. The composition according to claim 1, wherein said shell comprises:

a substantially inorganic first shell component comprising a condensed layer and a nanoparticle layer, wherein said condensed layer comprises a condensation product of a precursor, wherein said nanoparticle layer comprises inorganic nanoparticles, and wherein said condensed layer is disposed between said core and said nanoparticle layer; and an inorganic second shell component surrounding said first shell component, wherein said second shell component surrounds said nanoparticle layer;

wherein said precursor comprises at least one compound selected from Formula (I), Formula (II), and a mixture thereof;

wherein Formula (I) is $(M^vO_zY_n)_w$;

wherein Formula (II) is $(M^vO_zY_nR^1_p)_w$;

wherein for Formula (I), Formula (II), or the mixture thereof, each M is independently selected from silicon, titanium, and aluminum, v is the valence number of M and is 3 or 4, z is from 0.5 to 1.6, each Y is independently selected from —OH, —$OR^2$, halogen,

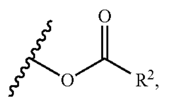

$NH_2$, —$NHR^2$, —$N(R^2)_2$, and

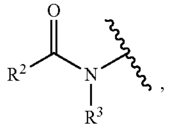

wherein $R^2$ is a $C_1$ to $C_{20}$ alkyl, $C_1$ to $C_{20}$ alkylene, $C_6$ to $C_{22}$ aryl, or a 5-12 membered heteroaryl, wherein said heteroaryl comprises from 1 to 3 ring heteroatoms selected from O, N, and S, wherein $R^3$ is a H, $C_1$ to $C_{20}$ alkyl, $C_1$ to $C_{20}$ alkylene, $C_6$ to $C_{22}$ aryl, or a 5-12 membered heteroaryl, wherein said heteroaryl comprises from 1 to 3 ring heteroatoms selected from O, N, and S, w is from 2 to 2000;

wherein for Formula (I) n is from 0.7 to (v−1); and wherein for Formula (II) n is from 0 to (v−1), each $R^1$ is independently selected from a $C_1$ to $C_{30}$ alkyl, a $C_1$ to $C_{30}$ alkylene, a $C_1$ to $C_{30}$ alkyl substituted with one or more of a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl, and a $C_1$ to $C_{30}$ alkylene substituted with one or more of a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl, and p is a positive number up to pmax, wherein pmax=60/[9*Mw($R^1$)+8], wherein Mw($R^1$) is the molecular weight of the $R^1$ group.

6. The composition according to claim 5, wherein said precursor comprises at least one compound according to Formula (I).

7. The composition according to claim 6, wherein said precursor is free of compounds according to Formula (II).

8. The composition according to claim 5, wherein said precursor comprises at least one compound according to Formula (II).

9. The composition according to claim 5, wherein the compounds of Formula (I), Formula (II), or both are characterized by one or more of the following:

a Polystyrene equivalent Weight Average Molecular Weight (Mw) of from about 700 Da to about 30,000 Da;

a degree of branching of 0.2 to about 0.6; and a molecular weight polydispersity index of about 1 to about 20.

10. The composition according to claim 5, wherein M is silicon.

11. The composition according to claim 5, wherein for Formula (I), Formula (II), or both Formula (I) and Formula (II), Y is OR, wherein R is selected from a methyl group, an ethyl group, a propyl group, and a butyl group.

12. The composition according to claim 5, wherein said second shell component comprises a material selected from calcium carbonate, silica, and a combination thereof.

13. The composition according to claim 5, wherein said inorganic nanoparticles of said first shell component comprise at least one of metal nanoparticles, mineral nanoparticles, metal-oxide nanoparticles or semi-metal oxide nanoparticles.

14. The composition according to claim 5, wherein said inorganic second shell component comprises at least one of $SiO_2$, $TiO_2$, $Al_2O_3$, $CaCO_3$, $Ca_2SiO_4$, $Fe_2O_3$, $Fe_3O_4$, iron, silver, nickel, gold, copper, or clay.

15. The composition according to claim 1, wherein said water soluble carrier is a water soluble polymer.

16. The composition according to claim 1, wherein said water soluble carrier is selected from polyalkylene oxide, polyethylene glycol, sodium acetate, sodium bicarbonate, sodium chloride, sodium silicate, polypropylene glycol polyoxoalkylene, polyethylene glycol fatty acid ester, polyethylene glycol ether, sodium sulfate, starch, and mixtures thereof.

17. The composition according to claim 1, wherein said plurality of capsules is present at a level of about 0.1% to about 20%, by weight of the composition.

18. A process for treating laundry comprising the steps of:

providing an article of laundry in a washing machine;

dispensing said plurality of individual particles according to claim 1 into said washing machine; and contacting said article of laundry during a wash sub-cycle of said washing machine with said plurality of individual particles.

19. The process according to claim 18 further comprising a step of dispensing into said washing machine a laundry detergent comprising from about 3% to about 60% by weight anionic or nonionic surfactant.

20. The process according to claim 19, wherein about 5 g to about 50 g of said plurality of individual particles is dispensed into said washing machine.

* * * * *